(12) United States Patent
Landa et al.

(10) Patent No.: US 8,954,580 B2
(45) Date of Patent: Feb. 10, 2015

(54) HYBRID INTERNET TRAFFIC MEASUREMENT USING SITE-CENTRIC AND PANEL DATA

(71) Applicant: Compete, Inc., Boston, MA (US)

(72) Inventors: Alon H. Landa, Brookline, MA (US); Jonathan Novick, Melrose, MA (US); Scott E. Gelin, Medford, MA (US); Amit Phansalkar, Newton, MA (US); Thomas E. Montroy, Dorchester, MA (US); Lauren S. Moores, New York, NY (US)

(73) Assignee: Compete, Inc., Boston, MA (US)

( * ) Notice: Subject to any disclaimer, the term of this patent is extended or adjusted under 35 U.S.C. 154(b) by 207 days.

(21) Appl. No.: 13/741,160

(22) Filed: Jan. 14, 2013

(65) Prior Publication Data
US 2013/0198376 A1  Aug. 1, 2013

Related U.S. Application Data

(63) Continuation-in-part of application No. 13/359,901, filed on Jan. 27, 2012, now Pat. No. 8,356,097.

(60) Provisional application No. 61/636,388, filed on Apr. 20, 2012.

(51) Int. Cl.
G06F 15/16 (2006.01)
H04L 12/26 (2006.01)
(Continued)

(52) U.S. Cl.
CPC ............ *H04L 43/0876* (2013.01); *G06Q 10/04* (2013.01); *G06Q 30/02* (2013.01)
USPC ........................................................ 709/224

(58) Field of Classification Search
CPC ..... H04L 43/0876; H04L 63/20; G06Q 30/02
USPC ................................... 709/200–203, 217–227
See application file for complete search history.

(56) References Cited

U.S. PATENT DOCUMENTS

| | | |
|---|---|---|
| 5,126,728 A | 6/1992 | Hall |
| 5,583,763 A | 12/1996 | Atcheson et al. |

(Continued)

FOREIGN PATENT DOCUMENTS

| | | |
|---|---|---|
| KR | 20030040263 | 5/2003 |
| KR | 20050005592 | 1/2005 |

(Continued)

OTHER PUBLICATIONS

"International Application Serial No. PCT/US2013/21469, Search Report and Written Opinion mailed Apr. 26, 2013", 6 pages.

(Continued)

*Primary Examiner* — Moustafa M Meky
(74) *Attorney, Agent, or Firm* — Strategic Patents, P.C.

(57) ABSTRACT

This disclosure concerns a hybrid method for estimating Internet traffic including determining a fraction of a target population consisting of users displaying an identified characteristic by analysis of a census-based measurement of internet traffic for at least one website and receiving their clickstream data. The method also includes identifying a fraction of the group of participants that share the one or more characteristics, determining a behavioral composition by scaling the fraction of the group of participants by the fraction of the target population, and producing, at the host processing facility, an estimate of the target population's activity with respect to at least a part of the Internet that includes the at least one website by scaling the clickstream data for the subset of the group of participants by applying a weight based on the behavioral composition and the relative size of the target population.

10 Claims, 22 Drawing Sheets

(51) Int. Cl.
*G06Q 10/04* (2012.01)
*G06Q 30/02* (2012.01)

(56) References Cited

U.S. PATENT DOCUMENTS

| | | |
|---|---|---|
| 5,749,081 A | 5/1998 | Whiteis |
| 5,893,077 A | 4/1999 | Griffin |
| 5,914,717 A | 6/1999 | Kleewein et al. |
| 5,930,764 A | 7/1999 | Melchione et al. |
| 6,055,570 A | 4/2000 | Nielsen |
| 6,216,135 B1 | 4/2001 | Brodersen et al. |
| 6,314,451 B1 | 11/2001 | Landsman et al. |
| 6,334,108 B1 | 12/2001 | Deaton et al. |
| 6,334,110 B1 | 12/2001 | Walter et al. |
| 6,448,981 B1 | 9/2002 | Kaczmarski |
| 6,519,571 B1 | 2/2003 | Guheen et al. |
| 6,574,587 B2 | 6/2003 | Waclawski |
| 6,606,304 B1 | 8/2003 | Grinter et al. |
| 6,707,422 B2 | 3/2004 | Sheynblat et al. |
| 6,721,749 B1 | 4/2004 | Najm et al. |
| 6,820,116 B1 | 11/2004 | Pyhalammi et al. |
| 6,834,372 B1 | 12/2004 | Becker et al. |
| 6,839,680 B1 | 1/2005 | Liu et al. |
| 6,847,969 B1 | 1/2005 | Mathai et al. |
| 6,904,408 B1 | 6/2005 | McCarthy et al. |
| 6,934,687 B1 | 8/2005 | Papierniak et al. |
| 6,934,748 B1 | 8/2005 | Louviere et al. |
| 6,981,040 B1 | 12/2005 | Konig et al. |
| 7,032,168 B1 | 4/2006 | Gerace et al. |
| 7,035,855 B1 | 4/2006 | Kilger et al. |
| 7,036,087 B1 | 4/2006 | Odom |
| 7,162,451 B2 | 1/2007 | Berger et al. |
| 7,243,075 B1 | 7/2007 | Shaffer et al. |
| 7,249,032 B1 | 7/2007 | Close et al. |
| 7,272,629 B2 | 9/2007 | Yamaura et al. |
| 7,373,313 B1 | 5/2008 | Kahle et al. |
| 7,386,466 B2 | 6/2008 | McLean et al. |
| 7,395,259 B2 | 7/2008 | Bailey et al. |
| 7,437,364 B1 | 10/2008 | Fredricksen et al. |
| 7,478,035 B1 | 1/2009 | Wrench et al. |
| 7,546,338 B2 * | 6/2009 | Schran .................... 709/203 |
| 7,558,822 B2 | 7/2009 | Fredricksen et al. |
| 7,565,425 B2 | 7/2009 | Van Vleet et al. |
| 7,730,120 B2 | 6/2010 | Singh et al. |
| 7,797,371 B2 | 9/2010 | Singh et al. |
| 7,814,139 B2 | 10/2010 | Singh et al. |
| 7,883,527 B2 | 2/2011 | Matsuura et al. |
| 7,890,451 B2 | 2/2011 | Cancel et al. |
| 7,895,258 B2 | 2/2011 | Singh et al. |
| 7,979,544 B2 | 7/2011 | Cancel et al. |
| 8,055,709 B2 | 11/2011 | Singh et al. |
| 8,095,621 B2 | 1/2012 | Singh et al. |
| 8,099,496 B2 | 1/2012 | Singh et al. |
| 8,135,833 B2 | 3/2012 | Cancel et al. |
| 8,516,591 B2 * | 8/2013 | Fly et al. .................... 726/24 |
| 8,560,596 B2 * | 10/2013 | Schran .................... 709/203 |
| 2001/0014868 A1 | 8/2001 | Herz et al. |
| 2001/0032115 A1 | 10/2001 | Goldstein |
| 2001/0051932 A1 | 12/2001 | Srinivasan et al. |
| 2001/0056405 A1 | 12/2001 | Muyres et al. |
| 2002/0004868 A1 | 1/2002 | Hagiwara |
| 2002/0010757 A1 | 1/2002 | Granik et al. |
| 2002/0016731 A1 | 2/2002 | Kupersmit |
| 2002/0035498 A1 | 3/2002 | Kehoe et al. |
| 2002/0038350 A1 | 3/2002 | Lambert et al. |
| 2002/0042733 A1 | 4/2002 | Lesandrini et al. |
| 2002/0042821 A1 | 4/2002 | Muret et al. |
| 2002/0052782 A1 | 5/2002 | Landesmann |
| 2002/0053078 A1 | 5/2002 | Holtz et al. |
| 2002/0063735 A1 | 5/2002 | Tamir et al. |
| 2002/0065912 A1 | 5/2002 | Catchpole et al. |
| 2002/0095387 A1 | 7/2002 | Sosa et al. |
| 2002/0099824 A1 | 7/2002 | Bender et al. |
| 2002/0100042 A1 | 7/2002 | Khoo et al. |
| 2002/0103680 A1 | 8/2002 | Newman |
| 2002/0107730 A1 | 8/2002 | Bernstein |
| 2002/0116348 A1 | 8/2002 | Phillips et al. |
| 2002/0116531 A1 | 8/2002 | Chu |
| 2002/0123359 A1 | 9/2002 | Wei et al. |
| 2002/0123926 A1 | 9/2002 | Bushold et al. |
| 2002/0143933 A1 | 10/2002 | Hind et al. |
| 2002/0143984 A1 | 10/2002 | Hudson Michel |
| 2002/0196273 A1 | 12/2002 | Krause |
| 2002/0198791 A1 | 12/2002 | Perkowski |
| 2002/0198882 A1 | 12/2002 | Linden et al. |
| 2003/0018677 A1 | 1/2003 | Mathur et al. |
| 2003/0023715 A1 | 1/2003 | Reiner et al. |
| 2003/0037124 A1 | 2/2003 | Yamaura et al. |
| 2003/0050815 A1 | 3/2003 | Seigel et al. |
| 2003/0053420 A1 | 3/2003 | Duckett et al. |
| 2003/0056136 A1 | 3/2003 | Aweya et al. |
| 2003/0101024 A1 | 5/2003 | Adar et al. |
| 2003/0105719 A1 | 6/2003 | Berger et al. |
| 2003/0110072 A1 | 6/2003 | Delurgio et al. |
| 2003/0126095 A1 | 7/2003 | Allen |
| 2003/0126250 A1 | 7/2003 | Jhanji |
| 2003/0128818 A1 | 7/2003 | Kerr et al. |
| 2003/0135405 A1 | 7/2003 | Townsend et al. |
| 2003/0149696 A1 | 8/2003 | Nelson et al. |
| 2003/0154162 A1 | 8/2003 | Danaher et al. |
| 2003/0171977 A1 | 9/2003 | Singh et al. |
| 2003/0189904 A1 | 10/2003 | Li |
| 2004/0064449 A1 | 4/2004 | Ripley et al. |
| 2004/0098229 A1 | 5/2004 | Error et al. |
| 2004/0107363 A1 * | 6/2004 | Monteverde .................... 713/201 |
| 2004/0172389 A1 | 9/2004 | Galai et al. |
| 2004/0177015 A1 | 9/2004 | Galai et al. |
| 2004/0205119 A1 | 10/2004 | Streble et al. |
| 2004/0249938 A1 | 12/2004 | Bunch |
| 2005/0004889 A1 | 1/2005 | Bailey et al. |
| 2005/0015723 A1 | 1/2005 | Light et al. |
| 2005/0091673 A1 | 4/2005 | Rhoten et al. |
| 2005/0222906 A1 | 10/2005 | Chen |
| 2005/0234922 A1 | 10/2005 | Parekh et al. |
| 2005/0235318 A1 | 10/2005 | Grauch et al. |
| 2006/0004717 A1 | 1/2006 | Ramarathnam et al. |
| 2006/0031205 A1 | 2/2006 | Perkins et al. |
| 2006/0080554 A1 | 4/2006 | McDonald et al. |
| 2006/0168054 A1 | 7/2006 | Burkhart et al. |
| 2006/0212698 A1 | 9/2006 | Peckover |
| 2006/0248452 A1 | 11/2006 | Lambert et al. |
| 2006/0253434 A1 | 11/2006 | Beriker et al. |
| 2007/0030528 A1 | 2/2007 | Quaeler et al. |
| 2007/0043817 A1 | 2/2007 | Oliver et al. |
| 2007/0055937 A1 | 3/2007 | Cancel et al. |
| 2007/0061313 A1 | 3/2007 | Kahle et al. |
| 2007/0198486 A1 | 8/2007 | Abrams et al. |
| 2008/0071767 A1 | 3/2008 | Grieselhuber et al. |
| 2008/0177778 A1 | 7/2008 | Cancel et al. |
| 2008/0177779 A1 | 7/2008 | Cancel et al. |
| 2008/0183664 A1 | 7/2008 | Cancel et al. |
| 2008/0183717 A1 | 7/2008 | Singh et al. |
| 2008/0183718 A1 | 7/2008 | Singh et al. |
| 2008/0183745 A1 | 7/2008 | Cancel et al. |
| 2008/0183796 A1 | 7/2008 | Singh et al. |
| 2008/0183805 A1 | 7/2008 | Cancel |
| 2008/0183806 A1 | 7/2008 | Cancel et al. |
| 2008/0183867 A1 | 7/2008 | Singh et al. |
| 2008/0183868 A1 | 7/2008 | Singh et al. |
| 2008/0183869 A1 | 7/2008 | Singh et al. |
| 2008/0183870 A1 | 7/2008 | Singh et al. |
| 2008/0189253 A1 | 8/2008 | Oliver et al. |
| 2008/0189254 A1 | 8/2008 | Cancel et al. |
| 2008/0189408 A1 | 8/2008 | Cancel et al. |
| 2008/0196098 A1 | 8/2008 | Cottrell et al. |
| 2008/0250026 A1 | 10/2008 | Linden et al. |
| 2008/0288635 A1 | 11/2008 | Jaye |
| 2008/0300904 A1 | 12/2008 | Malcolm |
| 2008/0301281 A1 | 12/2008 | Wang et al. |
| 2009/0006995 A1 | 1/2009 | Error et al. |
| 2009/0143064 A1 | 6/2009 | Bernini et al. |
| 2009/0265243 A1 | 10/2009 | Karassner et al. |
| 2010/0030894 A1 | 2/2010 | Cancel et al. |
| 2011/0015982 A1 | 1/2011 | Singh et al. |

(56) References Cited

U.S. PATENT DOCUMENTS

| | | | |
|---|---|---|---|
| 2011/0143811 A1 | 6/2011 | Rodriguez | |
| 2011/0283356 A1* | 11/2011 | Fly et al. | 726/22 |
| 2011/0296014 A1 | 12/2011 | Cancel et al. | |
| 2011/0307331 A1 | 12/2011 | Richard et al. | |
| 2012/0054862 A1* | 3/2012 | Jevans et al. | 726/22 |
| 2012/0131187 A1 | 5/2012 | Cancel et al. | |

FOREIGN PATENT DOCUMENTS

| | | |
|---|---|---|
| KR | 20060075696 | 7/2006 |
| WO | WO-2007021868 A2 | 2/2007 |
| WO | WO-2007/021868 A3 | 5/2009 |
| WO | WO 2009/064741 A1 | 5/2009 |
| WO | WO-2013112312 | 8/2013 |

OTHER PUBLICATIONS

"U.S. Appl. No. 13/359,901, Notice of Allowance mailed Sep. 21, 2012", 10 pgs.

"U.S. Appl. No. 11/923,454 Non-Final Office Action mailed Aug. 5, 2010",15 pages.

"U.S. Appl. No. 11/923,470, Non-Final Office Action mailed Aug. 28, 2009", 7 pgs.

"U.S. Appl. No. 11/923,506, Non-Final Office Action mailed Aug. 25, 2009", 15 Pgs.

"U.S. Appl. No. 11/923,454, Final Office Action mailed Aug. 19, 2009", 12 Pgs.

"U.S. Appl. No. 11/923,506, Non-Final Office Action mailed Aug. 11, 2010", 19 pgs.

"U.S. Appl. No. 11/463,611, Non-Final Office Action mailed Jun. 18, 2012", 29 pages.

"U.S. Appl. No. 11/923,454, Non-Final Office Action mailed May 4, 2011", 13 pages.

"U.S. Appl. No. 11/923,485, Final Office Action mailed May 4, 2011", 11 pages.

"U.S. Appl. No. 11/923,506, Non-Final Office Action mailed May 3, 2011", 16 pages.

"U.S. Appl. No. 11/938,710, Non-Final Office Action mailed May 28, 2010", 9 pages.

"U.S. Appl. No. 12/495,771, Notice of Allowance mailed May 11, 2011", 10 pages.

"U.S. Appl. No. 11/923,454, Non-Final Office Action mailed Apr. 5, 2010", 13 pages.

"U.S. Appl. No. 11/923,486, Final Office Action mailed Mar. 3, 2010", 2 pages.

"U.S. Appl. No. 11/938,716, Non-Final Office Action mailed Mar. 12, 2009", 6 pgs.

"U.S. Appl. No. 11/923,506, Final Office Action mailed Feb. 26, 2010", 21 pages.

"U.S. Appl. No. 11/923,470, Non-Final Office Action mailed Feb. 22, 2010", 13 pages.

"U.S. Appl. No. 11/938,710, Notice of Allowance mailed Feb. 17, 2010", 8 Pgs.

"U.S. Appl. No. 12/495,771, Non-Final Office Action mailed Dec. 2, 2010", 11 pages.

"U.S. Appl. No. 11/923,470 Final Office Action mailed Oct. 28, 2010", 15 pages.

"U.S. Appl. No. 11/938,710, Notice of Allowance mailed Oct. 15, 2010", 9 pgs.

"U.S. Appl. No. 11/923,454, Non-Final Office Action mailed Jan. 8, 2009", 7 pgs.

"U.S. Appl. No. 11/923,485, Non-Final Office Action mailed Jan. 6, 2011", 14 pages.

"U.S. Appl. No. 11/923,454, Final Office Action mailed Jan. 6, 2011", 15 pages.

"U.S. Appl. No. 11/463,611, Final Office Action mailed Jan. 19, 2011", 17 pages.

"U.S. Appl. No. 11/923,506, Final Office Action mailed Jan. 12, 2011", 19 pages.

"U.S. Appl. No. 10/267,978. Final Office Action", pp. 1-32.

"U.S. Appl. No. 11/923,485, Non-Final Office Action mailed Aug. 13, 2009", 2009 , 12 pgs.

Intl. Searching Authority, "PCT Search Report", PCT/US06/31259-071108 NPL-51 Jul. 11, 2008 , 10 pages.

"PCT_SearchReport", PCT/US2008/083151 Apr. 29, 2009 , all.

"U.S. Appl. No. 13/359,901, Non-Final Office Action mailed Apr. 10, 2012", 21 pages.

"U.S. Appl. No. 11/463,611, Non-Final Office Action mailed Aug. 3, 2010", , 17.

"U.S. Appl. No. 11/463,611, Non-Final Office Action mailed Aug. 4, 2009", , 16 pgs.

"U.S. Appl. No. 11/463,611, Non-Final Office Action mailed Jun. 23, 2008", OARN , 11 pgs.

"U.S. Appl. No. 11/463,611, Final Office Action mailed Mar. 19, 2009", FOAR , 12 pgs.

"U.S. Appl. No. 11/923,454, Non-Final Office Action mailed Oct. 6, 2011", , 13.

"U.S. Appl. No. 11/923,470,Non-Final Office Action mailed Dec. 9, 2011", , 15.

"U.S. Appl. No. 11/923,485, Non-Final Office Action mailed Sep. 9, 2011", , 11.

"U.S. Appl. No. 11/923,506, Non-Final Office Action mailed Oct. 6, 2011", , 14.

"U.S. Appl. No. 11/923,560, Non Final Office Action mailed Oct. 28, 2009", , 9.

"U.S. Appl. No. 11/923,608, Notice of Allowance mailed Jul. 9, 2010", , 11 pgs.

"U.S. Appl. No. 11/923,609, Final Office Action mailed Aug. 7, 2009", , 11 Pgs.

"U.S. Appl. No. 11/923,609 Non-Final Office Action mailed Jan. 15, 2009", , 7 Pgs.

"U.S. Appl. No. 11/923,610, Non Final Office Action mailed Sep. 2, 2009", , 19.

"U.S. Appl. No. 11/923,610, Notice of Allowance mailed Apr. 29, 2010", , 7.

"U.S. Appl. No. 11/923,617, Notice of Allowance mailed Sep. 13, 2010", , 7.

"U.S. Appl. No. 11/923,617, Non-Final Office Action mailed Sep. 1, 2009", , 11 Pgs.

"U.S. Appl. No. 11/923,620, Non-Final Office Action mailed Aug. 29, 2009", , 19 Pgs.

"U.S. Appl. No. 11/923,620, Notice of Allowance mailed Jun. 27, 2011", , 19.

"U.S. Appl. No. 11/923,621, Non-Final Office Action mailed Sep. 30, 2009", , 19 Pgs.

"U.S. Appl. No. 11/923,624, Non-Final Office Action mailed Sep. 29, 2009"19 Pgs.

"U.S. Appl. No. 11/923,624, Notice of Allowance mailed Oct. 5, 2011", , 23.

"U.S. Appl. No. 11/923,617, Notice of Allowance mailed Mar. 23, 2010", , 7.

"U.S. Appl. No. 13/150,370, Notice of Allowance mailed Nov. 8, 2011", , 22 PGS.

"U.S. Appl. No. 11/923,609, Notice of Allowance mailed Jan. 29, 2010", , 14 Pgs.

"U.S. Appl. No. 11/923,620, Final Office Action mailed Apr. 23, 2010", , 29 PGS.

"U.S. Appl. No. 11/923,621, Final Office Action mailed Apr. 23, 2010", , 29 Pages.

"U.S. Appl. No. 11/923,621, Notice of Allowance mailed Oct. 13, 2011", , 23.

"U.S. Appl. No. 11/923,624, Final Office Action mailed Apr. 23, 2010", , 28.

* cited by examiner

COMPETE ICI
SITE: WWW.GOOGLE.COM —— 400

SITE TRAFFIC[1] —— 401

| METRIC | 04/09/06 | RANK* | 04/02/06 | RANK* | % ^ |
|---|---|---|---|---|---|
| UNIQUE VISITORS | 74,634,227 | 2 | 73,067,719 | 2 | 2.14 ^ |
| SESSIONS | 241,848,344 | | 238,702,156 | | 1.32 ^ |
| PAGE VIEWS | 2,748,538,677 | 5 | 2,701,121,655 | 5 | 1.76 ^ |

* SITE RANKINGS ONLY AVAILABLE FOR UNIQUE VISITORS AND PAGE VIEWS METRICS

AVERAGE STAY[2] —— 402

| METRIC | 04/09/06 | 04/02/06 | % ^ |
|---|---|---|---|
| PAGE VIEWS PER SESSION | 11.36 | 11.32 | 0.43 ^ |
| STAY PER SESSION | 00:05:59 | 00:06:06 | -1.68 v |
| STAY PER PAGE | 00:00:32 | 00:00:32 | -2.10 v |

TOP SUBDOMAINS[3] —— 403

| | | % OF DOMAIN PAGE VIEWS | | |
|---|---|---|---|---|
| RANK | SUBDOMAIN | 04/09/06 | 04/02/06 | % ^ |
| 1 | WWW.GOOGLE.COM | 60.82 | 60.54 | 0.29 ^ |
| 2 | IMAGES.GOOGLE.COM | 23.10 | 23.26 | -0.16 v |
| 3 | MAIL.GOOGLE.COM | 12.04 | 12.10 | -0.06 v |
| 4 | GROUPS.GOOGLE.COM | 0.62 | 0.68 | -0.06 v |
| 5 | NEWS.GOOGLE.COM | 0.58 | 0.60 | -0.02 v |
| 6 | FROOGLE.GOOGLE.COM | 0.43 | 0.40 | 0.03 ^ |
| 7 | VIDEO.GOOGLE.COM | 0.37 | 0.38 | -0.01 v |
| 8 | GOOGLE.COM | 0.32 | 0.30 | 0.02 ^ |
| 9 | B.MAIL.GOOGLE.COM | 0.31 | 0.24 | 0.07 ^ |
| 10 | MAPS.GOOGLE.COM | 0.24 | 0.26 | -0.01 v |
| | | | | MORE... |

CONFIDENTIAL       © 2006 COMPETE, INC. ALL RIGHTS RESERVED

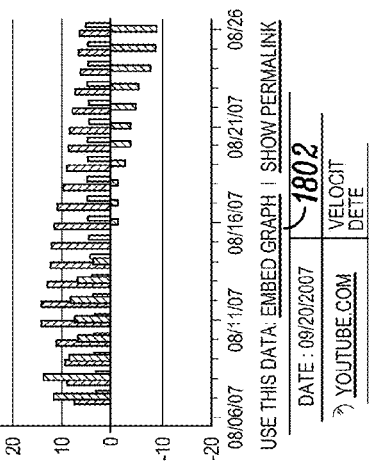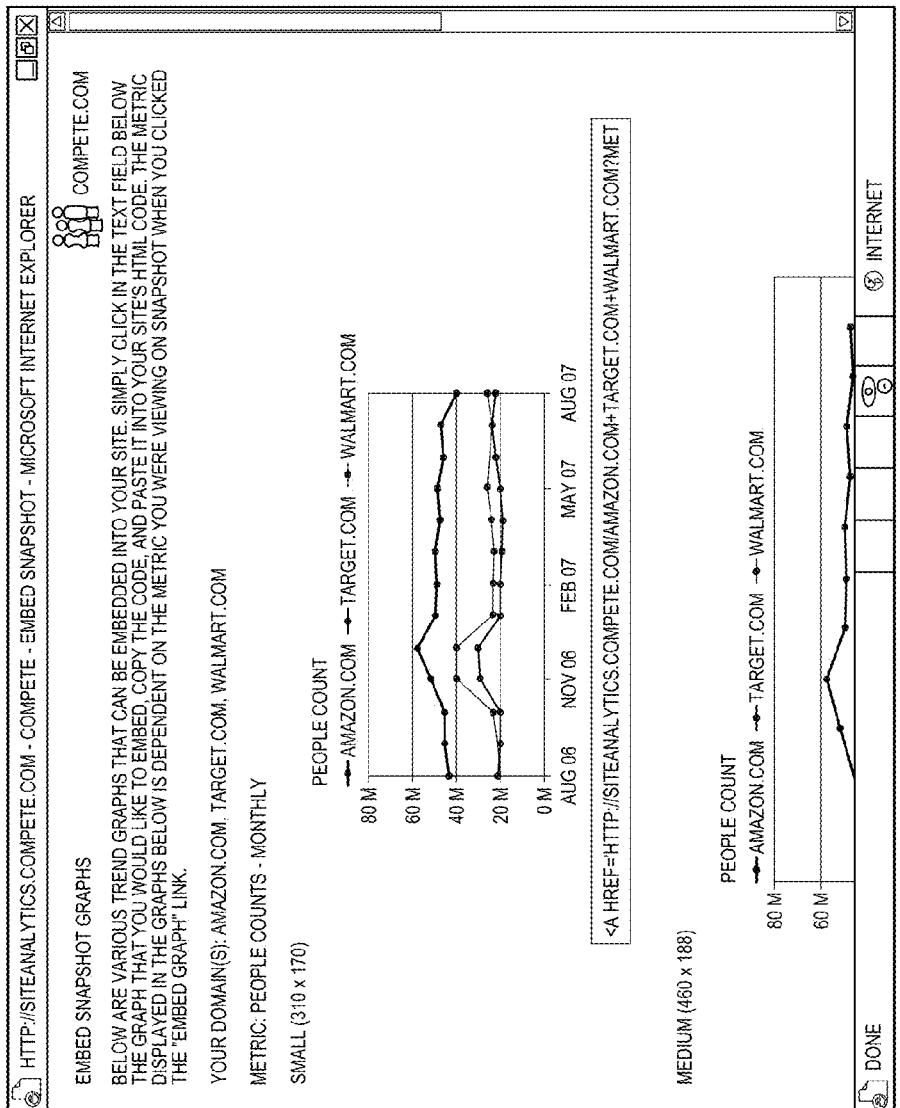
FIG. 18

HYBRID INTERNET TRAFFIC MEASUREMENT USING SITE-CENTRIC AND PANEL DATA

CROSS-REFERENCE TO RELATED APPLICATIONS

This application claims the benefit of U.S. Pat. Appl. No. 61/636,388, filed Apr. 20, 2012.

This application is a continuation-in-part of U.S. patent application Ser. No. 13/359,901 filed Jan. 27, 2012.

Each of the foregoing applications is incorporated herein by reference in its entirety.

BACKGROUND

1. Field

This invention relates to methods and systems for collecting, processing, and displaying information related to traffic on a web site.

2. Description of the Related Art

With an abundance of web sites on the Internet, it is becoming increasingly difficult to safely and efficiently navigate the Internet. In a practice known as 'spoofing' or 'phishing', malicious web sites will often lure users into visiting their web site under the pretense of offering genuine information or legitimate business. These web sites may appear, for example, in search results or as links in an e-mail. Typically, the user does not know that they have accessed a malicious web site until sometime after visiting the web site. Often, personal information may have already been shared on the malicious web site before the user becomes aware that the web site is malicious. Knowing whether or not a web site can be trusted prior to visiting the web site is a valuable tool in combating these malicious web sites.

Identifying trusted web sites is facilitated by collecting and analyzing user web behavior, or clickstreams, to determine a variety of metrics associated with a web site. By knowing a web site's popularity, historical and present-day, as derived from a clickstream analysis, an indication of trust can be generated for the web site. Other derived metrics are also valuable to the user. For instance, the metrics may include a list of the top ten web sites visited by users after having visited the current web site. The metrics may also include the ranking of the web site with respect to the most visited sites on the Internet.

The derived metrics may also facilitate identifying relevant search results. When a user executes a search, generally, results are displayed in a rank order determined by an algorithm. However, these algorithms do not account for post-search activity. For a given keyword search, for example, search results that have a high volume of clickstream activity may be deemed more relevant than other web sites where user dwell time was minimal. By integrating metrics derived from clickstream analysis with a search function, search results can be optimized to display the most relevant search results first.

The abundance of web sites on the Internet also makes efficiently identifying deals and promotions an arduous task. Some promotions may be obscure, some deals may be outdated, and others may simply not be well-advertised. By querying a data store of deals that can be supplemented by retailers, users, and data store maintainers, a typical set of search results can be annotated with an indication of whether or not a deal is present on a given web site.

Thus, a need exists for a method for alerting users as to malicious web sites before visiting the web site and increasing search efficiency by displaying relevant search results first and applicable deals associated with a given web site.

Effectively analyzing internet activity of a web site may be based on web site log files, cookies, and the like that may collect data that may, or may not, identify an individual visitor uniquely. The information collected may include visits by search engines, bots, spiders, repeat visitors, and the like. Such information, while providing a measure of accesses to the pages of a web site, may not provide useful information about people visiting and engaging various portions of a web site over a period of time, such as a month. Web logs may not be able to collect enough information about an access to the web site to determine if the access was from a unique person, a repeat visitor, a new visitor, a BOT, a spider, and the like.

The raw counts of such logs and the like, to be usefully applied to various perspectives must be put in context such as an estimate of internet traffic. Also, absent similar information from other web sites, it is impossible for a web site owner to determine how his web site fares compared to his competitors, and the like. When this information is privately held by each web site, the likelihood of gaining unrestricted access to a competitor's web site statistics is very small, if not impossible. Therefore, making a wealth of internet activity data available in accurate and timely fashion may be very desirable to web site owner, operators, advertisers, and the like. Determining methods and systems of collecting, structuring, aligning, analyzing, and presenting accurate estimates of internet activity, such as in a form of site metrics is needed.

A need exists for a system and method of internet traffic measurement that uses panel data and site-centric, or census, data.

SUMMARY

Site analytics may use clickstream data collected from a community of internet users to generate and present internet activity metrics. Data collected from a community of internet users may be augmented by clickstream data store content, third party content, search results, and other sources to form estimates of internet activity, such as traffic, that may be structured for analyzing to produce metrics of nearly any internet website or domain. The data may be further augmented with ratings, such as website trust ratings, retail deals, and analysis of web site content to form a comprehensive set of data that may be mined to formulate various metrics of internet activity about web sites. Metrics of internet activity, which may be called site analytics, may provide analysis that represents aspects of internet user access to a website. Such aspects may include, without limitation, activity related to visitors, engagement, growth, trust, deals, and the like. Data representing a number of visitors, unique visitors, and repeat visitors over a predetermined period of time may be analyzed to generate visitor metrics such as people counts, rank, and visits. Engagement metrics may use visitor data combined with duration data, such as duration per visit, to generate metrics such as attention (e.g. daily attention, monthly attention), average stay, and pages/visit. In addition to determining metrics associated with a period of time, growth may provide important metrics associated with daily changes and may represent velocity of attention, such as changes in daily attention.

Visitor metrics provide a perspective on users reaching out to a web site, such as by clicking a link in a search result or typing in a web address. Engagement metrics may provide a perspective on how well a website that a user has reached out to perform in keeping the user's attention or interest. Growth metrics may provide a perspective on how a change or an event associated with a web site may impact visitors and attention. Each of these metrics offers users, such as web site managers, advertisers, web site designers, individual internet users, marketing professionals, and the like various ways of looking at internet activity associated with a web site.

While each metric is associated with a single web site, calculating the same metric for a plurality of websites may facilitate viewing how the plurality of web sites compare in the metric. Grouping the plurality of web sites, such as by industry, region, size, and the like may allow a user to view the metric for the group of web sites as well as a relative comparison of the web sites selected for the group.

In addition to estimating and presenting internet activity for visitors, engagement, and growth, the data sources and algorithms may be applied to establishing an indication of trust of a web site. Users may perceive the indication of trust as a measure of safety or integrity that may be associated with at least aspects of the web site. Web site trust may be beneficially applied by an end user so that the user may have an understanding, prior to visiting a web site, what may be the level of trust that other users, such as users in a clickstream sharing community and users who have accessed the web site, may have attributed to the site. Users who have visited the web site may provide important information about their interaction with the web site that impact how users trust rating of a web site.

The data for calculating and presenting site metrics, which may include profile metrics, and for determining web site trust, may also be used to determine what, if any, retail related deals may be available for redemption on a web site or a remote store front location associated with the web site. By matching URLs with domains with store names and applying the matches to a data store of deals, the user may be presented with one or more deals (e.g. free shipping, free gift, and the like).

Site metrics may be presented to a user through a web site, chart, stacked graph, indication of metric associated with a search results, indication of metric associated with a web browser toolbar, and the like. The presented metrics may appear as graphs, lists, and data points in overlay windows, direct view windows, as elements in a document, through a web site, and the like.

Described and referenced herein are methods and systems for a data collecting platform (DCP) that records web browser click event data and provides a record of user on-line activity. The DCP may provide a data collection agent (DCA) and an update agent (UA) that reside on a user client station and a remote data collection server (DCS) to collect the recorded user on-line activity from the client station. The collected on-line activity may then be analyzed to determine how competitive sites may be viewed by the users.

A DCA may record the web browser click events of the user and may be activated as the client station operating system is booted. The DCA may remain active until the operating system is shut down. As the client station operating system boots up, the DCA may connect with the DCS for a time stamp that may be used for all future time recording of the web browser click events. In an embodiment, this time stamp request may assure that the plurality of DCA users click event data are based on the same clock. Therefore, as data is reviewed at a later date, the browser click events may be presented in the order of the events on one clock as opposed to the plurality of individual non-synchronized client station clocks. In an embodiment, the DCA may comprise a browser event plug-in, event state machine, rules engine, data recorder, update agent monitor, network performance monitor, DCS monitor, configuration engine, or other component that may be required to support web browser click event recording.

The DCA may have operational parameters that may be used by the various components of the DCA. In an embodiment, the operation parameters may be requested from the DCS through an HTTPS or HTTP connection. A configuration engine may process the operational parameters that may be in an XML file, SQL table, OBDC table, Jet data store, ASCII file, or other data format. Once the DCA receives new operational parameters, the configuration engine may update the DCA.

The client station may record the browser click event with a plurality of threads that monitor web browser activity and capture the web browser click events. The plurality of threads may be calculated by the connection throughput that may be determined by the network performance monitor (NPM). In an embodiment, periodically downloading a fixed length document and measuring the response time may determine the connection throughput and therefore determine the number of threads used by the DCA.

The web browser may be Microsoft Internet explorer (MSIE), AOL, Netscape, Firefox, or other compatible web browser. The DCA may use the web browser plug-in or similar capability as the method to detect the event. The web browser click event data may be recorded in a first-in-first-out (FIFO) queue as the user browses the web. The data recorder may adjust the FIFO queue order based on the operational parameters available on the client station. The web browser click event data may be transmitted directly to the data collection server, without the use of a FIFO. The web browser click event data may be transmitted in real-time to the data collection server. In an embodiment, the web browser click event data may be ordered into categories of collected data. The data recorder may transmit the data to the data collection server (DCS) for additional data processing. The data may be transmitted by HTTPS using the POST or other method. The DCS then may reply to the DCA with an XML file, SQL table, OBDC table, Jet data store, ASCII file, or other data format. The data may be transmitted by HTTP if a HTTPS connection is not accessible.

The web browser click event may be processed by the event state machine (ESM) whereby the web browser click event may be determined to be pertinent. Rules for web browser click events being pertinent may be determined by the operational parameters downloaded from the DCS. Non-pertinent web browser click events, such as those that are not determined to be pertinent by the operational parameters may be discarded, and no further processing may be performed on non-pertinent web browser click events. The web browser click event output may be the URL information of the web site visited and additional data, such as user ID, date, time, event type, or other available data passed to the rules engine.

The rules engine may transform the ESM web browser click event output by deleting information such as user name, password, account numbers, or like personal data. The rules engine may present additional actions based on user web browsing activity in that a secondary web browser window may be opened. In an embodiment, the secondary web browser window may require a user interaction such as an on-line survey or other user action. In an embodiment, the rules engine may request new rules from DCS in the form of an XML file, SQL table, OBDC table, Jet data store, ASCII file, or other data format, and the new rules may over write existing rules. There may be a graphical user interface (GUI) provided to DCS administrators to allow adding or editing of rules. The added or edited rules may be for subsequent web browser click events once downloaded to the DCA. After the rules engine completes the web browser click event transformations, the web browser click events may be transmitted to the data recorder and may be sent as a click-stream file to the DCS.

The event logger may record operational events such as application start, application stop, application re-starts, or other application operation events. The operational events that may be transmitted to DCS may be a separate file from a click-stream file.

There may be a UA that may download software updates from the DCS. If an update is available from the DCS, the update may be downloaded and launched. In an embodiment, the download may be received in an installation facility, which may include an executable script such as a Nullsoft Scriptable Install System (NSIS) from Nullsoft. In an embodiment, the update may execute on the client station in a sequence that may comprise un-compression of the update, shut down of required software, installation of new update, changes to the Registry (e.g. Microsoft® Windows® Registry) that reflect the nature of the update, and restart of the software. The sequence of downloading and installing new software updates may run as a background application and may be unnoticed by the user. In an embodiment, the UA may verify that the DCA is operational, and the DCA may verify that the UA is operational. The UA may restart the DCA or the DCA may restart the UA. Alternatively, updating may not require to be performed as a background activity.

The DCS may be a collection of dedicated software, off the shelf software, custom software, and storage that may record click-stream data from the DCA. In an embodiment, the DCA may accrue raw events from a plurality of users into at least one raw event file; these files may be based on a one to one mapping of DCS servers to raw event logs. The DCA may then transmit the raw event files to a holding area for aggregation.

In an aspect of the invention, a method includes presenting, associated with a search result, an indication of trust of a web site that is included in the search result, wherein the trust indicator of a web site is generated by analyzing at least two of clickstream data from a panel of users, a clickstream data store, and a third-party determination of web site trust.

The method further includes providing a web browser plug-in to communicate with a host; receiving web site deal data from the host; and presenting an indication of availability of deals representing the received web site deal data.

In the method, the indication of trust represents a result of analyzing one or more of estimated internet traffic, popularity information, user generated rankings, site characteristics, a third-party score, and a third-party security service. The indicator of trust is one or more of a drop-down menu, a numerical indicator, a visual indicator, and an audio indicator. The numerical indicator is one or more of a percentage, a rating, a ratio, and a fraction. The visual indicator is one or more of a light bulb, a check mark, an X, a thumbs-up, a thumbs-down, an array of stars, a color, and a bar graph.

In another aspect of the invention, a method includes presenting, in a search result, an indication of availability of deals associated with a web site that is included in the search result, wherein the indication of availability of deals is based on querying a deals database to identify deals that are being offered through a domain referenced by the web site; and presenting, associated with a search result, an indication of a trust of a web site that is included in the search result, wherein the trust indicator of a web site is generated by analyzing at least two of clickstream data from a panel of users, a clickstream database, and a third-party determination of web site trust.

The method further includes providing a web browser plug-in to communicate with a host; receiving web site deal data from the host; and presenting an indication of availability of deals representing the received web site deal data. The indication of availability of deals comprises one or more of a drop-down menu, a visual indicator, a numerical indicator, and an audio indicator. The visual indicator is one or more of a light bulb, a check mark, an X, a thumbs-up, a thumbs-down, a dollar sign, a color, and a star. The indication of availability of deals includes availability of one or more of on-line redeemable deals and off-line redeemable deals. The availability of off-line redeemable deals is determined by analyzing a URL of the web site to identify an off-line store name, and querying the deals database to identify deals associated with the off-line store name. The off-line store is an off-line location of a business presented in the web site.

In another aspect of the invention, a method includes presenting, associated with a search result, an indication of availability of profile metrics associated with a web site that is included in the search result, wherein the profile metrics reflect a result of analyzing clickstream data from a panel of users.

In the method, the profile metrics are selected from a set consisting of people count, rank, visitors, attention, average stay, page views, and velocity. In the method, positioning a cursor over the indication displays an overlay window comprising one or more of an internet activity related metric of the web site, a statement of the web site trust metric, and a preview of deals associated with the web site.

In another aspect of the invention, a method includes receiving a search request; generating search results in response to the request; querying a clickstream data store of statistical information related to internet usage by a panel of users to identify a relevance of the search results; displaying the search results in order of relevance; and presenting, in the search results, an indication of trust of a web site that is included in the search result, wherein the trust of a web site is generated from analyzing at least two of real-time clickstream sharing by a plurality of users, a clickstream database, and a third-party determination of web site trust.

The method further includes presenting, in the search results, an indication of availability of profile metrics associated with a web site that is included in the search result, wherein the profile metrics reflect a result of analyzing one or more of real-time clickstream sharing by a plurality of users and a clickstream database.

In the method, the profile metrics are selected from a set consisting of people count, rank, visitors, attention, average stay, page views, and velocity. Positioning a cursor over the indication displays an overlay window comprising one or more of an internet activity related metric of the web site, a statement of the web site trust metric, and a preview of deals associated with the web site.

In another aspect of the invention, a method includes receiving a search request; generating search results in response to the request; querying a clickstream data store of statistical information related to internet usage by a panel of users to identify a relevance of the search results; displaying the search results in order of relevance; and presenting, in the search result, an indication of availability of deals associated with a web site that is included in the search result, wherein the indication of availability of deals is based on querying a deals database to identify deals that are being offered through a domain referenced by the web site.

The method further includes presenting, in the search result, an indication of availability of profile metrics associated with a web site that is included in the search result, wherein the profile metrics reflect a result of analyzing one or more of real-time clickstream sharing by a plurality of users and a clickstream database. The profile metrics are selected from a set consisting of people count, rank, visitors, attention, average stay, page views, and velocity. Positioning a cursor over the indication displays an overlay window comprising one or more of an internet activity related metric of the web site, a statement of the web site trust metric, and a preview of deals associated with the web site.

In an aspect of the invention, a method may include collecting statistical information related to a web site, processing the statistical information, and displaying the processed statistical information on one or more of a web site and a desktop application. In a variation of this method, the statistical information is derived from one or more of real-time clickstream sharing and a clickstream data store. Users may opt-in to or opt-out of real-time clickstream sharing.

In variations of this method, the statistical information can be user-generated, normalized, or raw.

In another variation of this method, the processed statistical information comprises one or more of user volume, user dwell time, user activity, user purchases, user downloads, click-throughs, click-aways, pageview ranking, user ranking, top search terms, other sites visited, site popularity, site profile, indicator of trust, and other similar information. In examples of this variation, the indicator of trust is derived from one or more of popularity information, user generated rankings, other site characteristics, a third party score, third party security services, and similar sources. In another example of this variation, the indicator of trust is one or more of a drop-down menu, a numerical indicator, a visual indicator, and an audio indicator. The numerical indicator can be one or more of a percentage, a rating, a ratio, a fraction, and similar numerical representations. The visual indicator can be one or more of a light bulb, a check mark, an X, a thumbs-up, a thumbs-down, an array of stars, bar graph, and similar visual representations.

In yet another variation of this method, the desktop application comprises one or more of a toolbar, a plug-in, a shared application, a windows application, and some other desktop application.

In yet another variation of this method, the processed statistical information is super-imposed on the web site.

In still another variation of this method, the processed statistical information is represented by one or more of a visual representation, a numerical representation, and an audio representation. In an example of this variation, the visual representation comprises one or more of a light bulb, a check mark, an X, a thumbs-up, a thumbs-down, an array of stars, bar graph, and similar visual representations.

In another aspect of the invention, a method may include receiving popularity information, user generated rankings, and other site characteristics associated with a web site, generating an indicator of trust using at least one of popularity information, user generated rankings, and other site characteristics, and displaying the indicator of trust on the web site.

In yet another aspect of the invention, a method may include querying a deals data store by a domain web site identifier, generating an indicator of applicable deals, and displaying the indicator of applicable deals on one or more of a domain web site and a desktop application.

In a variation of this method, the indicator of applicable deals comprises one or more of a drop-down menu, a visual indicator, a numerical indicator, and an audio indicator. In an example of this variation, the visual indicator comprises one or more of a light bulb, a check mark, an X, a thumbs-up, a thumbs-down, a dollar sign, a star, and similar representations.

In a variation of this method, the deals data store can be updated by users, direct retailers, third-party vendors, data store owners, clickstream analysis, and other similar methods and entities.

In still another aspect of the invention, a method may include receiving a search request, generating search results in response to the search request, querying a clickstream data store to identify a relevance of the search results, and displaying the search results in order of relevance.

In a variation of this method, generating search results comprises executing an algorithmic search. In another variation of this method, a relevance is determined by post-search activity of a plurality of users.

In a variation of this method, the method further comprises displaying a visual indicator adjacent to a search result comprising one or more of an indicator of trust, processed statistical information, and an indicator of applicable deals.

In another variation of this method, the method further comprises displaying a snapshot overlay associated with a search result comprising one or more of an indicator of trust, processed statistical information and an indicator of applicable deals. In an example of this variation, the snapshot overlay provides detailed information.

In an aspect, a method of estimating Internet traffic includes identifying one or more characteristics related to which it is desired to estimate Internet traffic, determining a fraction of a target population consisting of users displaying the characteristic by analysis of a census-based measurement of internet traffic for at least one website, receiving clickstream data at a host processing facility from a group of participants that connotes Internet activity of individual members of the group of participants, the Internet activity relating to at least one website, identifying a fraction of the group of participants that share the one or more characteristics, determining a behavioral composition by scaling the fraction of the group of participants by the fraction of the target population, and producing, at the host processing facility, an estimate of the target population's activity with respect to at least a part of the Internet that includes the at least one website by scaling the clickstream data for the subset of the group of participants by applying a weight based on the behavioral composition and the relative size of the target population. Refining the estimate of the target population's Internet activity may be done by applying a global inflation factor to the estimate. The one or more characteristics may relate to at least one of an internet browsing behavior, a demographic characteristic, and a geographic characteristic. The weight may be used to scale the clickstream data for the subset of the group of participants with respect to a plurality of websites. Refining the estimate may be done by iteratively applying a weight based on one or more of a demographic composition and a geographic composition of the target population to the estimate.

In an aspect, a computer-implemented system for estimating Internet traffic may include an analysis facility, operating on at least one processor, that determines a fraction of a target population consisting of users displaying one or more characteristics related to which it is desired to estimate Internet traffic by analysis of a census-based measurement of internet traffic for at least one website, a host processing facility that receives clickstream data from a group of participants that connotes Internet activity of individual members of the group of participants, the Internet activity relating to at least one website, and an analysis facility, operating on at least one processor, that determines a behavioral composition by scaling the fraction of the group of participants that share the one or more characteristics by the fraction of the target population, wherein an estimate of the target population's activity with respect to at least a part of the Internet that includes the at least one website is produced at the host processing facility by scaling the clickstream data for the subset of the group of participants by applying a weight based on the behavioral composition and the relative size of the target population. The estimate of the target population's Internet activity may be refined by applying a global inflation factor to the estimate. The one or more characteristics may relate to at least one of an internet browsing behavior, a demographic characteristic, and a geographic characteristic. The weight may be used to scale the clickstream data for the subset of the group of participants with respect to a plurality of websites. The estimate may be refined by iteratively applying a weight based on one or more of a demographic composition and a geographic composition of the target population to the estimate.

BRIEF DESCRIPTION OF FIGURES

The systems and methods described herein may be understood by reference to the following figures:

FIG. 4 shows a screenshot of a detailed web analytics web site.

FIG. 5 shows a screenshot of a web site with a site profile overlay.

FIG. 6 shows a screenshot of a web site with a deal indicator overlay.

FIG. 18 depicts a user selection for embedding a site analytic metric chart.

DETAILED DESCRIPTION OF FIGURES

Figure 1:
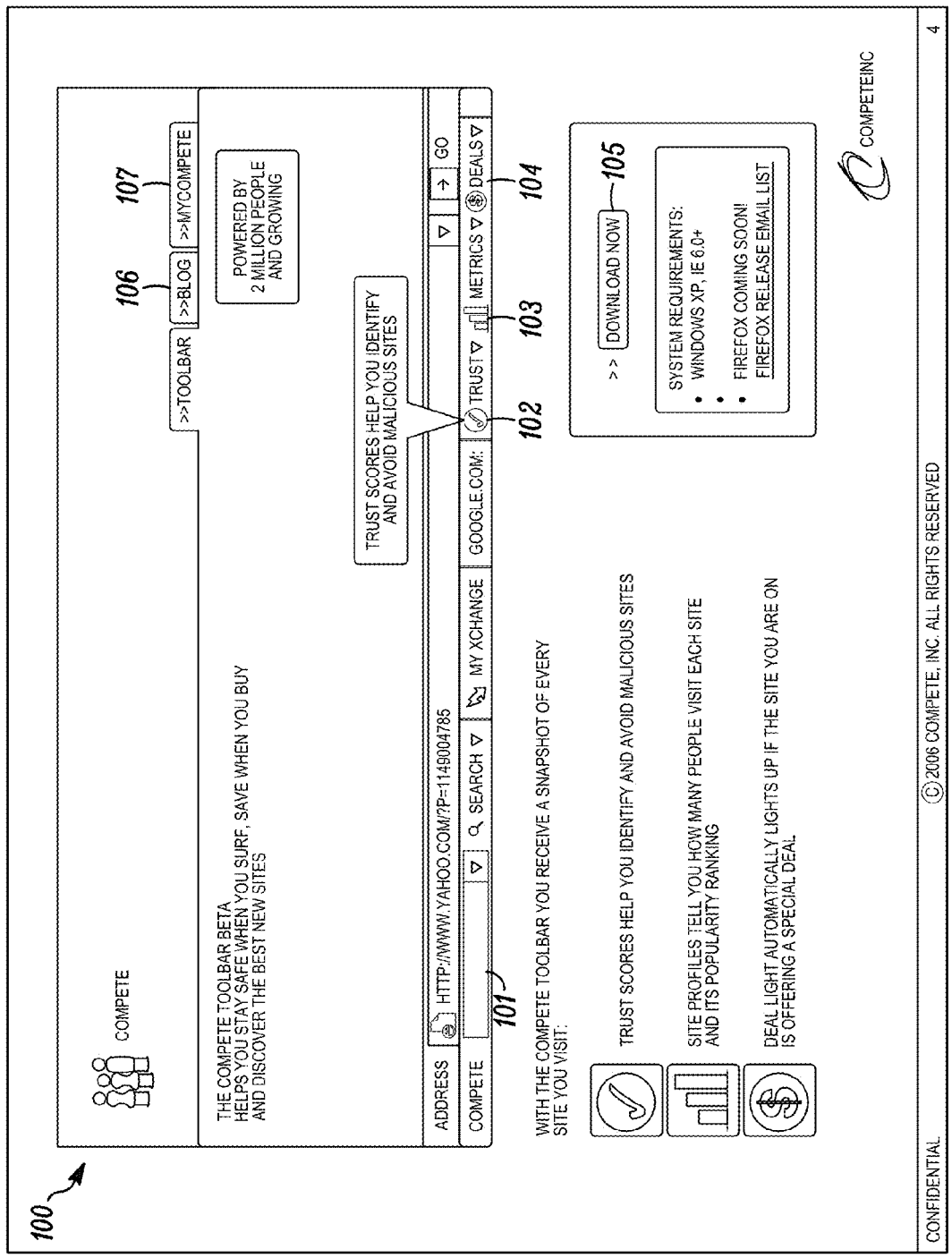
FIG. 1 shows a screenshot of the front page of a web site from where a toolbar can be downloaded and a blog or a personalized web site can be visited.

Referring first to FIG. 1, an aspect of the invention involves a toolbar 100 which comprises one or more of a search box 101, a trust indicator 102, a site profile 103, and an applicable deals indicator 104. When a user downloads the toolbar 100 through a download facility 105, they are given the opportunity to participate in real-time clickstream sharing. The users may opt-in or opt-out of this participation at any time. Clickstream activity by users is analyzed and stored in a clickstream data store. The analyzed clickstream data can be mined for a variety of statistical information including, but not limited to, user volume, user dwell time, user activity, click-throughs, click-aways, pageview ranking, user ranking, top search terms, other sites visited, site popularity, indicator of trust 102, site profile 103 and other similar information.

In addition to displaying the analyzed clickstream data in the toolbar 100, the information can be super-imposed on a website, displayed adjacent to a website link, displayed in a desktop application, displayed in a Windows application, or displayed in a snapshot overlay 200-202. Additionally, the toolbar can operate in a variety of web browsers.

The indicator of trust 102 is a score derived from clickstream data, including a site's popularity and a site's history. In some cases, the indicator of trust 102 may also be derived from user-generated rankings, other site characteristics, a third party score, third party security services, and other similar sources. In some instances, the indicator of trust 102 is a score derived from the combination of the clickstream data score and a third party score. For instance, a website with no current history and/or sporadic historical activity is indicative of a website for which an indication of caution may be generated. However, for a website with a high current volume of activity and abundant past activity, like Amazon.com, an indication of trust will be generated.

The indicator of trust 102 may be represented by one or more of a numerical indicator, a visual indicator, and an audio indicator. The indicator of trust 102 can be displayed automatically in a toolbar, super-imposed on a website, displayed adjacent to a website link, displayed in a desktop application, displayed in a Windows application, or displayed in a snapshot overlay 200. The numerical indicator can be one or more of a percentage, a rating, a ratio, a fraction, and similar numerical representations. For instance, a website with no current history or historical activity may receive a score of 0%. Similarly, a website like Amazon.com may receive a score of 100%. The visual indicator may be one or more of a light bulb, a check mark, a thumbs-up, a thumbs-down, an array of stars, bar graph, and similar visual representations. For example, Amazon.com may receive a thumbs-up, but a website with no current history or historical activity will receive a thumbs-down.

The site profile 103 aggregates the statistical information derived from a clickstream data analysis. A site profile 103 may include, but is not limited to, user volume, user dwell time, user activity, click-throughs, click-aways, pageview ranking, user ranking, top search terms, other sites visited, and current and historical site popularity. The site profile 103 can be displayed automatically in a toolbar, super-imposed on a website, displayed adjacent to a website link, displayed in a desktop application, displayed in a Windows application, or displayed in a snapshot overlay 201. For example, the site profile 103 may include a list of the top ten websites visited by users after having visited the current website. The site profile 103 may also include the ranking of the website with respect to the most visited sites on the Internet.

The site profile 103 may be represented by one or more of a numerical indicator, a visual indicator, and an audio indicator. The numerical indicator can be one or more of a percentage, a rating, a ratio, a fraction, and similar numerical representations. For instance, a site profile 103 may indicate that 5,000,000 people visited Amazon.com in the previous week. The visual indicator may be one or more of a light bulb, a check mark, a thumbs-up, a thumbs-down, an array of stars, bar graph, and similar visual representations. For example, Amazon.com may receive five out of five stars to indicate high user volume, while a website with little clickstream activity will receive only one out of five stars.

The deal indicator 104 provides information regarding promotions being currently offered on a website. When a user requests a particular website or initiates a search request through the search box 101, a deals data store is queried by a domain identifier for the requested website or the websites comprising the search results. If the domain has an applicable deal, a deal indicator 104 is generated. When the requested website or the search results are displayed, the deal indicator 104 is also displayed on one or more of the domain website and a desktop application. The deal indicator 104 may comprise one or more of a drop-down menu, a visual indicator, a numerical indicator, and an audio indicator. The visual indicator may be one or more of a light bulb, a check mark, an X, a thumbs-up, a thumbs-down, a dollar sign, a star, and similar representations. For example, if a user requests a website for which there are three current deals, a visual indicator, like a light bulb, will be displayed on the website. Alternatively, the deal indicator 104 may be a pull-down menu in the toolbar that includes all three deals. The deal indicator 104 can be displayed automatically in a toolbar, super-imposed on a website, displayed adjacent to a website link, displayed in a desktop application, displayed in a Windows application, or displayed in a snapshot overlay 202. In addition to the data store owners and their partners, the deals data store can be updated by users, direct retailers, third-party vendors, clickstream analysis, and other similar methods and entities.

Other features of the toolbar 100 may include a blog facility 106, a personalized search feature 107, detailed web analytics, and other such features. These features may also be offered separate from the toolbar 100.

Figure 2:
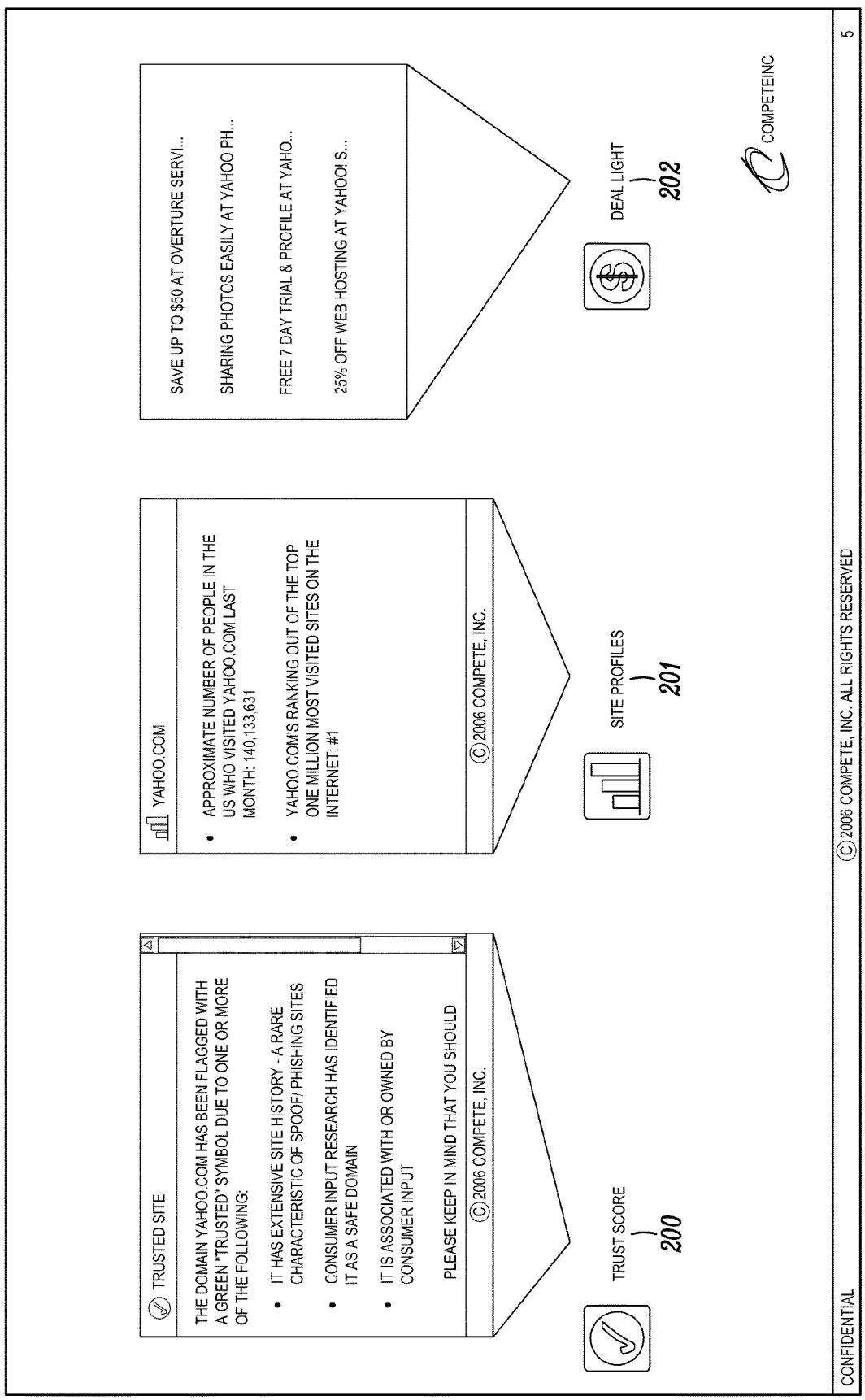
FIG. 2 shows a variety of snapshot overlays and corresponding sample icons.

Referring now to FIG. 2, an aspect of the invention involves snapshot overlays. The snapshot overlays depicted include examples of a trust indicator overlay 200, a site profile overlay 201, and a deal indicator overlay 202. Each snapshot overlay 200-202 can be associated with a representation of a trust indicator 102, a site profile 103, and an applicable deals indicator 104. For example, a trust indicator 102 may be represented by a checkmark icon associated with a toolbar 100. When a user clicks on the checkmark icon, a trust indicator overlay 200 is activated. The trust indicator overlay 200 may include information about the site history, the site's trust status, the owner of the site, tips on how to safeguard information, and other similar items. The site profile overlay 201 may include information about user volume, user dwell time, user activity, click-throughs, click-aways, pageview ranking, user ranking, top search terms, other sites visited, site popularity, and other similar information. The deal indicator overlay 203 may include information about applicable deals, new feature trials, and other similar information.

Figure 3:
FIG. 3 shows a variety of snapshot overlays comprising different trust indicators.

Referring now to FIG. 3, in addition to a trust indicator overlay 200 that provides information about a trusted website, information about potentially malicious and malicious websites can be provided in the trust indicator overlay 301-302.

Referring now to FIG. 4, an aspect of the invention involves detailed website analytics. For a given website 400, a variety of detailed web analytics can be derived from clickstream data analysis including site traffic 401 (e.g.: number of visitors, the number of unique visitors, the number of sessions, the number of page views), average stay 402 (e.g.: page views per session, stay per session, stay per page), top subdomains 403, and other such website analytics. The site profile 103 is derived from the detailed web analytics. The detailed web analytics can be accessed by a user through the toolbar 100, in place of the site profile 103, in addition to the site profile 103, a separate website, an e-mail, a report, and other such access means.

Figure 5:
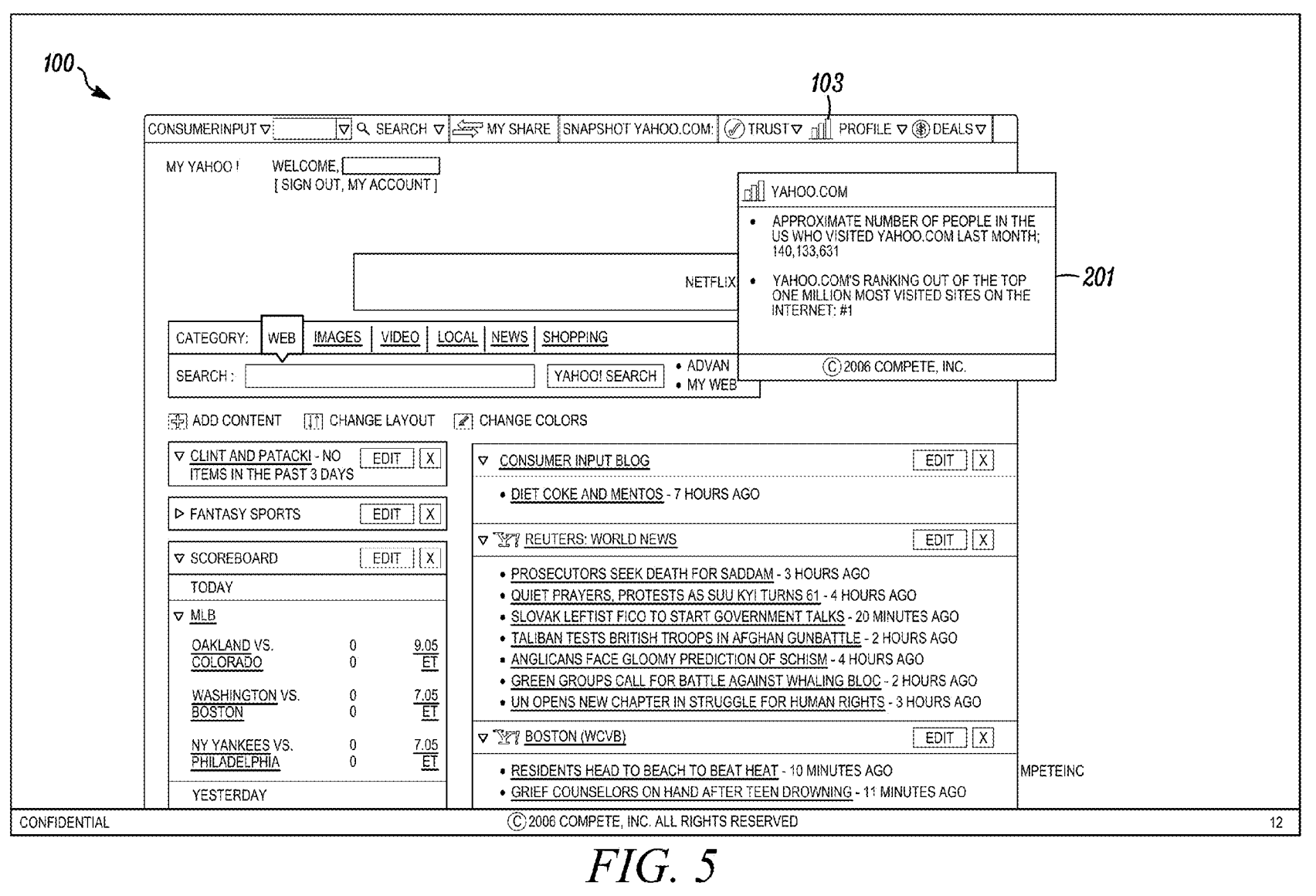

Referring now to FIG. 5, when a user navigates to a website, the toolbar 100 populates with information related to the website being visited. The user may choose to access any of the toolbar 100 features by clicking or positioning the mouse on the icon representing that feature or navigating to the feature by keyboard entry or touchscreen entry. For example, in FIG. 5, after a user has navigated to Yahoo.com, the toolbar 100 populates with information specific to the website. In this example, the site profile 103 icon has been accessed and a site profile overlay 201 is displayed.

Figure 6:
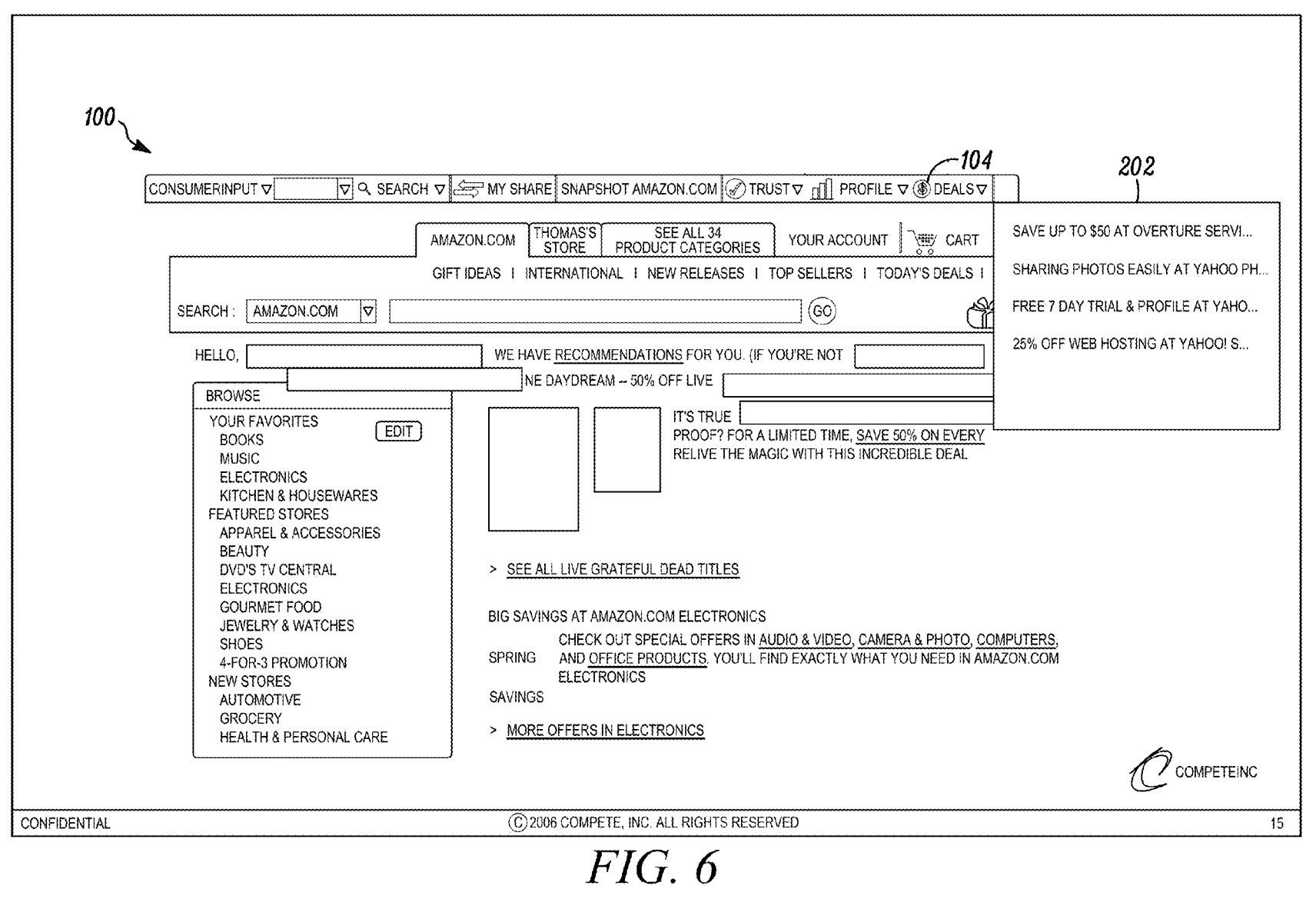

For example, in FIG. 6, after a user has navigated to Amazon.com, the toolbar 100 populates with information specific to the website. In this example, the deals indicator 104 icon has been accessed and a deal indicator overlay 202 is displayed.

Figure 7:
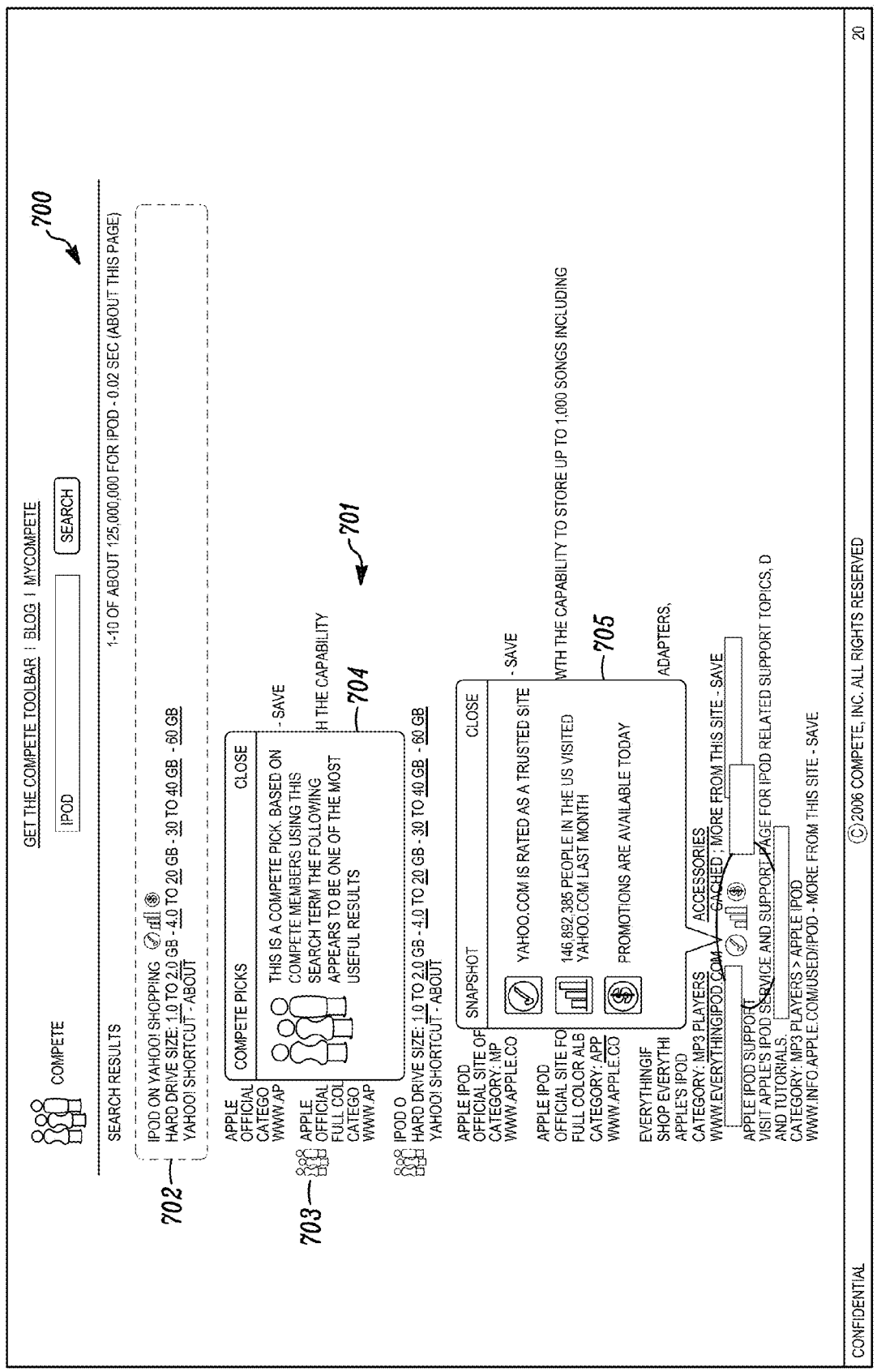
FIG. 7 shows a screenshot of a set of search results generated using the search function of the invention and snapshot overlays.

Referring now to FIG. 7, an aspect of the invention involves a search function. When a user initiates a search in the search box 101 of a toolbar 100 or through a search website 700, the request is processed by a search facility and search results are generated. The search facility can be a publicly available search engine, a subscription-based search engine, a proprietary search engine, a specialized search engine, and other similar search facilities. The search results are then used to query a clickstream data store to determine the relevancy of the results. A website that receives the most post-search activity, as determined by page views and other similar statistical information, in relation to a particular search term are promoted over domains that receive less activity. The search results are displayed in order of relevance with the most relevant results 701 being displayed first. A display of search results may be affected by relevance in other ways. Relevance may be used to identify social picks and the social picks may be prioritized to be displayed above other results. The other results may be displayed in an order based on relevance or based on search engine prioritization not taking relevance into consideration. Relevance may be used to display only a subset of results that are identified as relevant by the panel of users (e.g. social picks only). Social picks may alternatively be displayed and identified as social picks in a non-relevance based search result. Sponsored search results 702 may also be displayed. For example, a user searches for the term 'books'. The top three results from the search may be the New York Public Library, eBay, and an independent bookseller. After querying the clickstream data store, however, different results from the same set of search results are deemed more relevant. Now, the top three results may be Amazon.com, Barnes & Noble, and Borders.

The search function may comprise displaying a visual indicator adjacent to a search result comprising one or more of a trust indicator 102, a site profile 103, an applicable deals indicator 104, and a relevant results indicator 703. When a relevant result or social pick has been determined, a relevant result overlay 704 may be associated with a relevant results indicator 703. The search function may also comprise displaying a snapshot overlay (e.g. toolbar bubble, drop-down) 200-202 associated with a search result comprising one or more of a trust indicator 102, a site profile 103, and an applicable deals indicator 104. The snapshot overlay 200-202 may provide more detailed information about a particular search result. As a user scrolls over, clicks on, or navigates to the visual indicators adjacent to the search results, an overlay containing additional information pops up. Additionally, an aggregate overlay 705 which aggregates one or more of a trust indicator 102, a site profile 103, and an applicable deals indicator 104 may be displayed.

Figure 8:
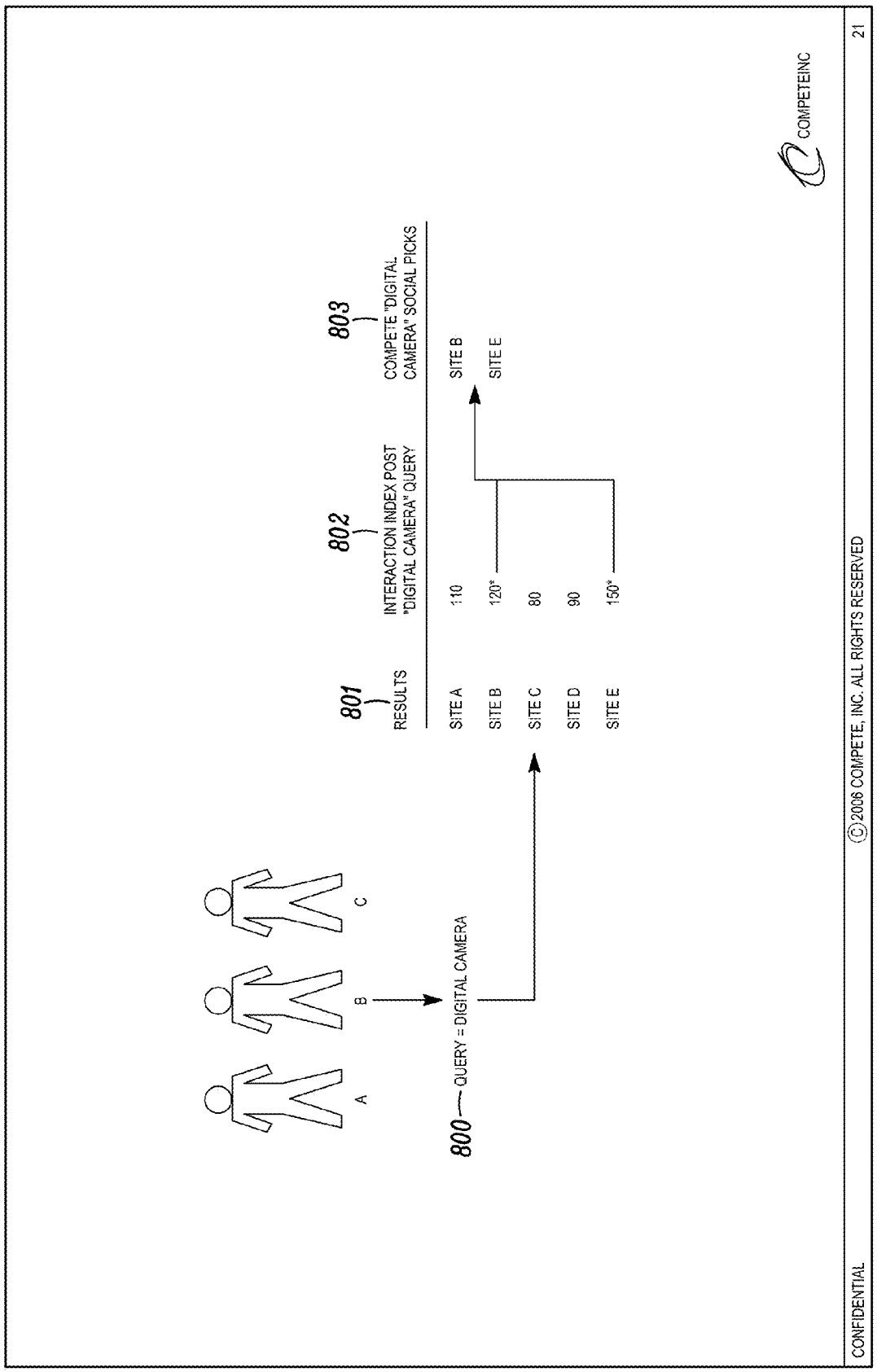
FIG. 8 shows a graphical description of the process used to generate a social pick.

Referring now to FIG. 8, the process by which relevant results or social picks are determined is depicted. In the example, a user initiates a search query 800 for "digital camera". The search results 801 generated in response to the query 800 include five sites, Sites A through E. The click-stream data store is then queried with each of the five results and an Interaction Index Post-Search Query 802 for the query 800 "digital camera" is associated with each of the results 801. The Interaction Index Post-Search Query 802 gives an indication of the relevancy of the result 801. The results 801 with the greatest Interaction Index are relevant results 803 and are promoted over the other results.

Internet traffic may be estimated through methodologies that apply techniques of aggregation, transformation, and normalization from the fields of mathematics, statistics and the data sciences to enhance collected data. One of a plurality of sources of data for estimating internet traffic is a community of participants who contribute their internet activity. The community covers nearly every U.S. website available to the public. The statistics may ensure internet traffic estimates balance demographic and connection factors that match the entire U.S. Internet population. Internet traffic may be estimated by calculating the number of people in the U.S. that visit any given Web site over a period of time such as a calendar month. International internet traffic and usage calculations may be performed using similar methodologies. In an example, a web site profile may estimate how many people visit the site based on a sample of the participant community, wherein the sample is normalized to the size and demographic composition of the active U.S. Internet population. Although the U.S. internet population and U.S. web sites are used as examples in this disclosure, the methods and systems may be applied to all internet users and all web sites throughout the world and beyond.

Traffic estimated may be based on a definition of 'people' that is different compared to traffic reported through common local analytic solutions and traffic log analyzers. In an example, 'people' may include U.S. consumers, which means a consumer is counted only once no matter how often he or she visits a site throughout the course of an estimation period. In a comparative example, local analytic solutions may include domestic and international traffic and often include spiders and bots that appear as traffic, but do not represent actual human activity. Common sources of local analytic solutions may rely on log files or cookies which do not support distinguishing consumers to generate accurate estimates. Data sources such as spiders, bots, log files, agents, pingbacks, RSS update traffic, IP addresses, and the like may not be included in internet traffic estimates herein disclosed and used.

A metric associated with estimated internet traffic may be a count of people visiting a site, (e.g. People Count). People Count may be influenced by factors such as advertising. In an example, a site could drive up its People Count by buying a lot of advertising across the Internet. If users respond to the advertising by selecting a link that redirects them to the site, the people count may increase. Because People Count counts each person uniquely, the increased count could indicate the number of new visitors to the site during the current counting period (e.g. a month). However, many of these people may leave the site immediately; such as if they find the site does not meet their current preferences or needs. Therefore, while people counts is a valuable metric, other metrics may provide an understanding of how people respond to the site once they have selected it, such as in an internet advertisement in this example. A type of metric that may provide an understanding of a user's engagement with a web site may include aspects such as an amount of time a user stays connected to the site or how many pages the user looks at.

People count may be calculated as a count of unique visitors (people) to a website over a predetermined period of time. A default period of time may be a calendar month. People count may be calculated for a plurality of periods of time so that each period of time may be available for use and presentation to a user. People count may be calculated for a plurality of web sites over the plurality of periods of time so that the people counts for each of the web sites in each of the periods of time may be available for use and presentation to a user. In an example, a user may identify three websites for which the user would like to view a people count metric for each of the last 13 months. A data store of information collected and analyzed as described herein and in any referenced documents may be accessed to compute a monthly people count metric for each of the three identified websites. The resulting calculations may be stored in a file, data store, or other memory so that they can be presented to the user. The stored people count metrics may be presented as a table, a line graph, a bar graph, a series of pie charts, and any other text based or graph based output. In addition to being able to generate three different people counts for three different web sites, people counts, and other metrics herein described can be generated as an aggregated people count for a category of web sites, businesses, domains, blogs, and the like (e.g. Book Sellers). An individual user who may visit multiple sites in a category may be counted as only one user for the category so that people counts within a category reflect the same type of count as people counts for a web site. Without identifying the user uniquely, this may be impossible to do accurately.

People count may be associated with other metrics related to websites, such as traffic rank and visits. People count may also be beneficial in calculating an internet traffic rank of a website (e.g. a Rank metric) by comparing the people count over a period of time for a number of web sites. The web sites may be sorted based on their people count and presented in an order, such as highest people count to lowest people count. The web sites may include any subset of internet websites, such as US web sites, news websites, shopping web sites, patent law related web sites, government web sites, and any other grouping or category that may be established based on aspects of web sites. In an example, a ranking of US websites may include any type of website that is hosted in the US. In the example, people count for the US websites may be accumulated over a period of one month. The web site with the highest people count over the month would rank first, the web site with the next highest people count would rank second, and so forth.

People count may also be beneficial in calculating a visit metric (Visits). Because people count is determined based on a specific individual access to a website, each visit by a specific individual may be counted. Additionally, a time between interactions with a website during a visit may be measured and used to determine a visit metric. Because both information on a website is dynamic, and user activity associated with the internet may be interrupted by activity unrelated to the internet (e.g. meetings, phone calls, offline research, and the like), it may be beneficial to account for and assess the impact of these interruptions. Therefore a visit metric may count two web site interactions by a specific individual as two visits if the interaction is separated by a minimum amount of time. In this way, even if a user opens and first interacts with a web site in a web browser but does not have a second interaction with the open website again for a minimum amount of time, each of the first and second interactions may be counted as visits in a visit metric. The minimum amount of time may be predetermined (e.g. 30 minutes), may be selectable (e.g. by a user or administrator), may be adaptable based on user activity history (e.g. a single user, all users in a community, and the like), or may be based on the website (e.g. interactions with a shopping web site in which the second interaction is only to checkout of a shopping cart that was filled in the first interaction may not be counted as a second visit).

Site analytics may include analytics associated with visitors, engagement, growth, and the like. Visitors may include people counts, website traffic rank, visits, and the like. Engagement may include attention metrics, average stay metrics, pages per visit metrics, and the like. Growth may include velocity metrics, and the like.

Engagement metrics may facilitate determining visitor attention associated with one or more websites. Attention considers all the time we collectively spend online and then determines what percentage of that time was spent on a given site. Although unique visitors and page views that may be determined from visitor metrics such as people counts, traffic rank, and visits are critical pieces of the puzzle, other metrics may facilitate accurately measuring engagement of visitors to web sites. Technologies such as AJAX and online video may require measures associated with engagement to provide metrics associated with activities enabled by these technologies.

Engagement metrics may include how much time people spend on a site and how many pages they look at on average during each visit to more fully understand the site's popularity, or ability to engage visitors.

Attention metrics may facilitate planning and measuring internet activity in a way that may reflect how individuals manage their time interacting with web sites over the internet. Attention may provide a useful and effective measure of how people allocated their time to websites. Generally, if a site can garner more of an individual's time it can be considered a good thing for the website owner, content and advertising contributors, and the like associated with the web site. Attention metrics may provide an important piece of the internet traffic puzzle and may be valuable to web site owners, advertisers, and the like.

Attention metrics may be used to show how attention for each individual site that is included in a presentation of attention metrics contributes to a total attention for all the included sites. Attention may be calculated as a percent of internet traffic. The internet traffic used in the calculation of attention may include an estimate of all U.S. internet traffic. The internet traffic used in the calculation of attention may include an estimate of a subset of internet traffic, such as a subset associated with a market, a category of website, a geographic region, a specific list of websites, a normalized estimate of internet traffic, and the like. Attention metrics may be calculated for a predetermined period of time, such as a day, a week, a month, or other time. Attention metrics may be calculated for a plurality of periods of time so that each period of time may be available for use and presentation to a user. Attention metrics may be calculated for a plurality of web sites over the plurality of periods of time so that the attention metrics for each of the web sites in each of the periods of time may be available for use and presentation to a user. In an example, a user may identify three websites for which the user would like to view attention for each of the last 13 months. A data store of information collected and analyzed as described herein and in any referenced documents may be accessed to compute a monthly attention metric for each of the three identified websites. The resulting calculations may be stored in a file, data store, or other memory so that they can be presented to the user. The stored attention metrics may be presented as a table, a line graph, a bar graph, a series of pie charts, stacked area graph, and any other text based or graph based output. A stacked area graph may facilitate easily viewing an attention metric of one site relative to another.

Engagement type metrics may include average stay metrics. An average stay metric may be used as an engagement metric. Historically, site engagement may have been measured exclusively by page views. However, with the introduction of technologies, such as AJAX and online video, sites are able to reduce the number of clicks (a trigger for a page view) a visitor needs to make to obtain the information they are seeking. An average stay engagement metric can be interpreted through different lenses that are focused on different objectives. A content site like MySpace will strive to keep people on the site as long as possible per visit. In contrast, a search engine like Google will want to help users find the best results and navigate away from a search results page as fast as possible. While MySpace may consider long average stays desirable, Google may consider long average stays concerning. Likewise, Google may view very short average stays as desirable, whereas MySpace may consider very short average stays concerning. Engagement metrics, such as average stay metrics, may facilitate a variety of business objectives, without having to be tightly coupled to the business objectives.

Engagement type metrics may include pages per visit metrics. A pages per visit metric may be used as an engagement metric. Pages per visit may be related to a page views metric. Pages per visit may be an average over the visits by the user, whereas page views may be a total metric across all visits. Pages per visit may represent an average number of clicks a person makes on a given website. When technology such as AJAX and online video are added to a web site, other engagement metrics, such as attention as herein described, may be important to supplement pages per visit metrics in determining an assessment of user engagement with a web site.

Site analytics may include visitor related metrics, engagement related metrics, and growth related metrics. Growth related metrics may include a velocity metric which may include aspects of engagement, such as daily attention. In an example, velocity metrics may be useful in reporting a relative change in daily Attention. Velocity metrics may facilitate determining growth of a domain. Velocity metrics may represent domain growth over a particular timeframe (e.g. a day, month, or any period of time). Domain growth may be measurable using a velocity metric relative to an initial attention metric. By calculating and presenting velocity metrics for a plurality of web sites, relative growth performance of the sites may be compared. Velocity metrics may facilitate effectively measuring the impact of planned (or unplanned) events, such as new advertising campaigns, product/service launches or general site growth.

Because velocity metrics may be derived from people time spent on a site, it can be used to assess the quality of traffic generated by the event/campaign. In an example a site could increase a visitor count, such as People Count, by buying a lot of pop-up ads across the Internet. Therefore, by using velocity along with People Count, it may be possible to determine not only how many additional people are visiting a website, but how effective the website is in engaging people who have responded to an advertising campaign (for example).

Trust metrics may help users experience a safer web by warning of potentially malicious Web sites, such as those associated with spyware, phishing, and online scams. Trust metrics may be determined by site history, domain name evaluation, third-party security services, community feedback and research associated with the community of participants providing internet traffic data. In an example of site history, if a site does not achieve a minimum amount of visits from the community, it may be flagged as suspicious. Most spoof/phishing sites may be launched for short periods of time and may not have an established site history. Using the community as one measure of site history, it is difficult for malicious operators to create a fake site history. In an example of domain name evaluation, if a site is not a 'named domain' and uses an IP address as its visual identifier it may be flagged as suspicious. In an example of third-party services, trust scores from third parties such as GeoTrust®—a division of VeriSign®—and CastleCops may be included in an analysis of a trust metric for a web site. In an example of community research, data may be collected from partners and through searching the web to identify web sites that offer free downloads that bundle unwanted adware and spyware. Calculating a trust metric may use research data supporting such unwanted downloads. Trust metrics may be based on data such as community based feedback, algorithms, traffic estimates as herein described, and the like. Each data source may be analyzed, weighted, normalized, adjusted, or otherwise manipulated to provide a measure of trust associated with a web site.

Deals associated with websites may be indicated by a deal indicator that may be presented in association with a website, such as in a toolbar of a web browser through which the user is viewing the website or on a search result display. An association of a deal with a website may be determined based on information related to the website being displayed in a web browser or being presented on a list of search results. Such an association may result from determining a domain name, a URL, or a store name associated with the website presented or listed and using the determined domain name, URL, or store name to lookup deals in a deals data store (e.g. a deals data store). To facilitate determining available deals, associations between a URL and a domain and/or a store name may be maintained in a deal lookup data store, in a portion of the deals data store, or in a separate file or memory. Using the stored URL associations may readily facilitate finding matching deals. However, it is not necessary to use the stored URL associations to determine appropriate deals.

Deals may be offered on the internet based on a store name, such as retailers like Macy's, Nordstroms, Harrods. Similarly, deals may be available from stores that are not redeemable on the internet, such as for a free gift when visiting a grand opening of a retail location. Therefore, associating store names with search and web browser web sites may facilitate determining which off-line deals are available. A deal indicator, described herein and in any referenced document, may indicate an on-line deal, an off-line deal, or both. A deals data store may include on-line deals, off-line deals, or both on-line and off-line deals. In addition to stores, any other business establishment, government agency, educational institution, non-profit institution, individual, cooperative, association, and the like may offer on-line and/or off-line deals that may be detectable using the systems and methods described herein and in any referenced document.

A user's clickstream activity, such as a history of the user activity, may be applied to a deal indication so that deals may be targeted to a user. In addition to evaluating a deal data store for an association between a web site or domain and a deal, the deal data store may include additional parameters associated with deals that may be matched to user clickstream data so that deals with a high relevance, based on this matching may be included in deals offered to the user through the indication of availability of deals. Targeted deals may impact how the deal indicator is presented so that the user may determine if deals with high relevance are available. The indication may change color, blink, present a different image, and the like when relevant deals are available.

Site metrics and the many variations of presenting the site metrics herein described may be presented on computers operating a variety of operating systems including, without limitation, Windows (XP, ME, 98SE, 2000, VISTA), MAC OS, Linux, and the like. Metric indicators may be presented in association with various web browsers including, without limitation Microsoft Internet Explorer, Netscape, AOL browser, Firefox, Opera, MacWeb, and the like. Metric indicators, and graphs associated with the metrics may be presented in association with various programs using standard interface methods such as Application Program Interfaces (APIs), search engines (e.g. Google, Yahoo, AOL, MSN Live), and the like. Presentation of indications of deals, site profiles, trust, and the like in association with search engine search results may be deployed using an API so that the indicators may overlay the search results. An API may allow a visually intuitive alignment of the indicators with the list of search results so that a user can see the indicators clearly associated with each search result. Presentation of metrics may be associated with information gathered from a variety of sources, such sources of company information (e.g. Zoom-Info), FTO and STO type tools, and the like.

Figure 9:
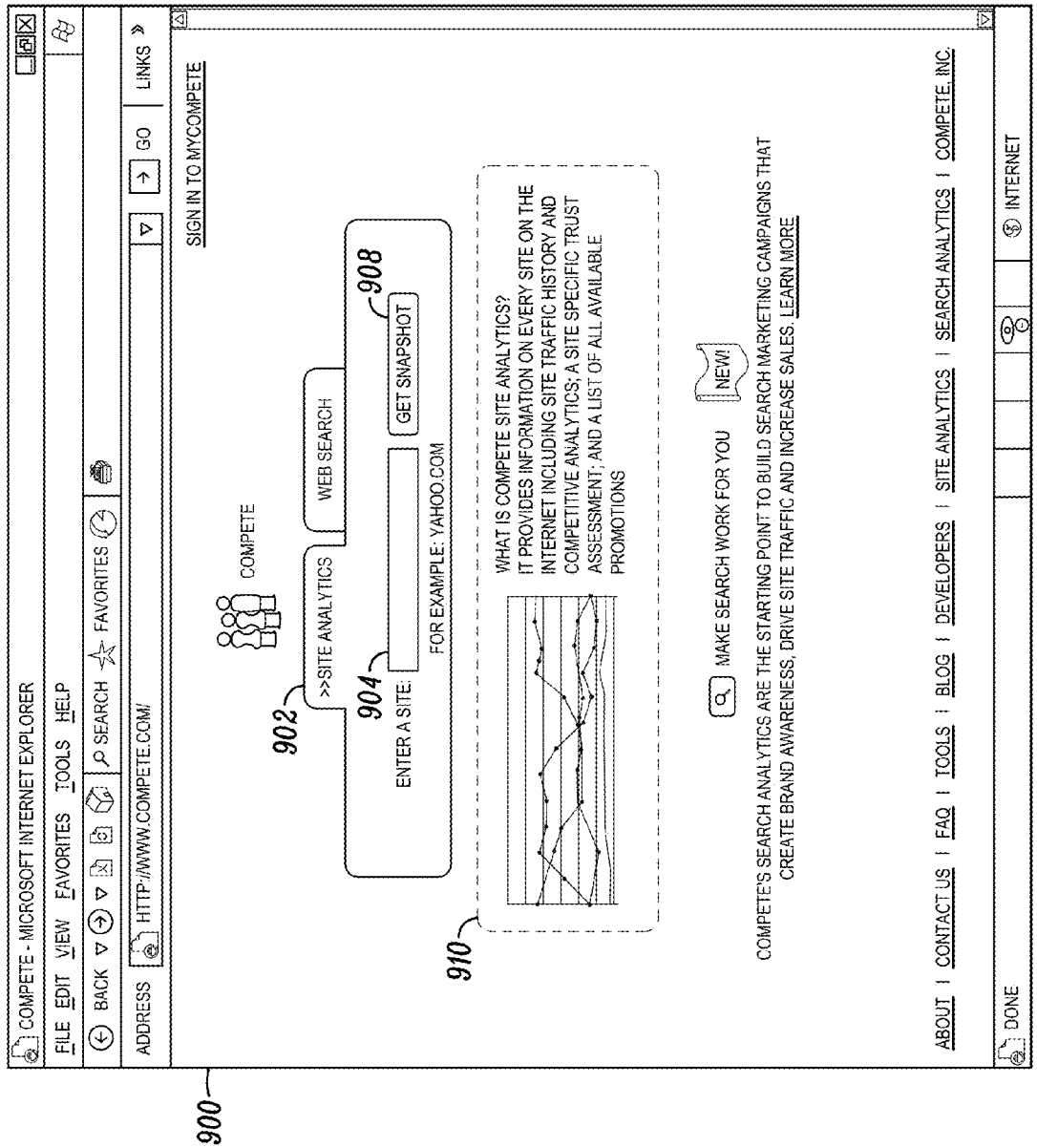
FIG. 9 depicts a web browser presentation of a web page for accessing site analytics.

FIG. 9 depicts a web page for accessing site analytics. This home page 900 facilitates access to site analytics for a single web site and may be an initial screen presented to a user wishing to access site analytics. Features that may distinguish this home page 900 include a visual identification 902 that the purpose of the page is to access site analytics, a data entry portion 904 in which a user may enter a web site name, an action icon or button 908 by which a user may capture a snapshot of site related analytics and metrics, and an overview description 910 of site analytics. A user interacting with home page 900 may enter a web site name, or a portion thereof, into box 904 followed by selecting action icon 908 to cause data to be gathered from the clickstream data store or any of the others sources herein disclosed, the gathered data to be analyzed, and the analyzed data to be presented as shown in an example of site analytics depicted in FIG. 10.

Figure 10:
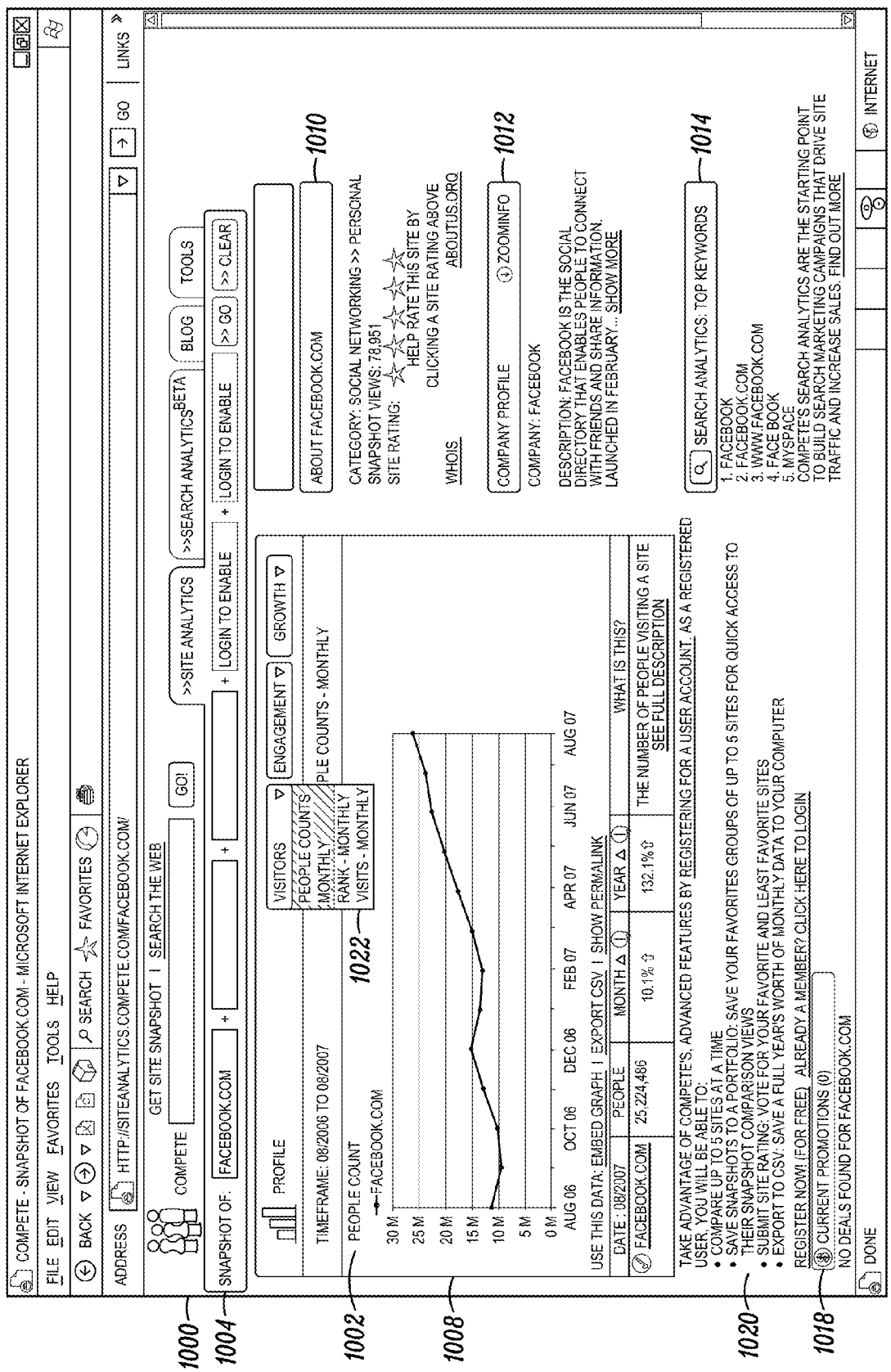
FIG. 10 depicts a site analytics presentation screen as viewed through a web browser.

FIG. 10 depicts a site analytics screen 1000 as presented through a web browser. The screen 1000 may be a default presentation resulting from a user selecting action icon 908 as shown in FIG. 9. In this example screen 1000, a site metric people count 1002 is presented in chart form. In this screen 1000, a user may select additional web sites to be included in the presentation of the people counts metric by entering the web sites in the snapshot input bar 1004 and selecting the "GO" action button in the snapshot input bar 1004. People count metric 1002 is shown as discrete counts per month over a thirteen month time period. This information is presented as a line graph 1008 showing each monthly count as a point on the graphed line. The graph 1008 includes a horizontal axis of time (e.g. month-year) and a vertical axis of counts (e.g. people count). Each point in the chart 1008 represents the people count metric (vertical axis) for each month presented (horizontal axis). At the bottom of the chart 1008, a user is presented various information about the metric including, the date of the most recent data in the chart, the metric value (e.g. People) associated with the most recent date, a percentage of change in the metric from the most recent date from the next most recent date (monthly % change), a percentage of change in the metric from the most recent date to the oldest date shown on the chart 1008 (yearly % change), and an overview description of the metric being presented in the chart 1008 with a selectable link to "See Full Description" of the metric. Selecting this link may present a pop-up window such as is shown in FIG. 11.

In addition to the metric, each similar site analytics screen may include features that provide useful information about the subject web site. An analytics overview 1010 provides information about the site that may relate to sources of information or other aspects of the site that can be derived from site analytics data sources. Company profile 1012 may include information collected from public or private sources, such as company information data stores. A user may select to view additional company profile information by selecting "Show More" within the company profile 1012 portion of the web site. In addition to the presented site analytic (e.g. people count 1002), search analytics top keywords 1014 as herein described may be presented for the subject web site. Promotional deals available for the subject web site may be presented in a current promotions 1018 section of the site analytics screen. Also, a user may be invited to take advantage of advanced features such as comparing more than three sites, saving snapshots to a portfolio, submitting site ratings, exporting data, and the like. The invitation may be extended through registration offer 1020. Site analytic screen 1000 also includes drop down metric selection menu 1022 through which a user can select any of several other web site metrics for presentation in chart form. Selecting an entry in the drop down site analytics menu 1022 may result in a new window being presented for the selected metric from the menu, such as rank metric shown in FIG. 12.

Figure 11:
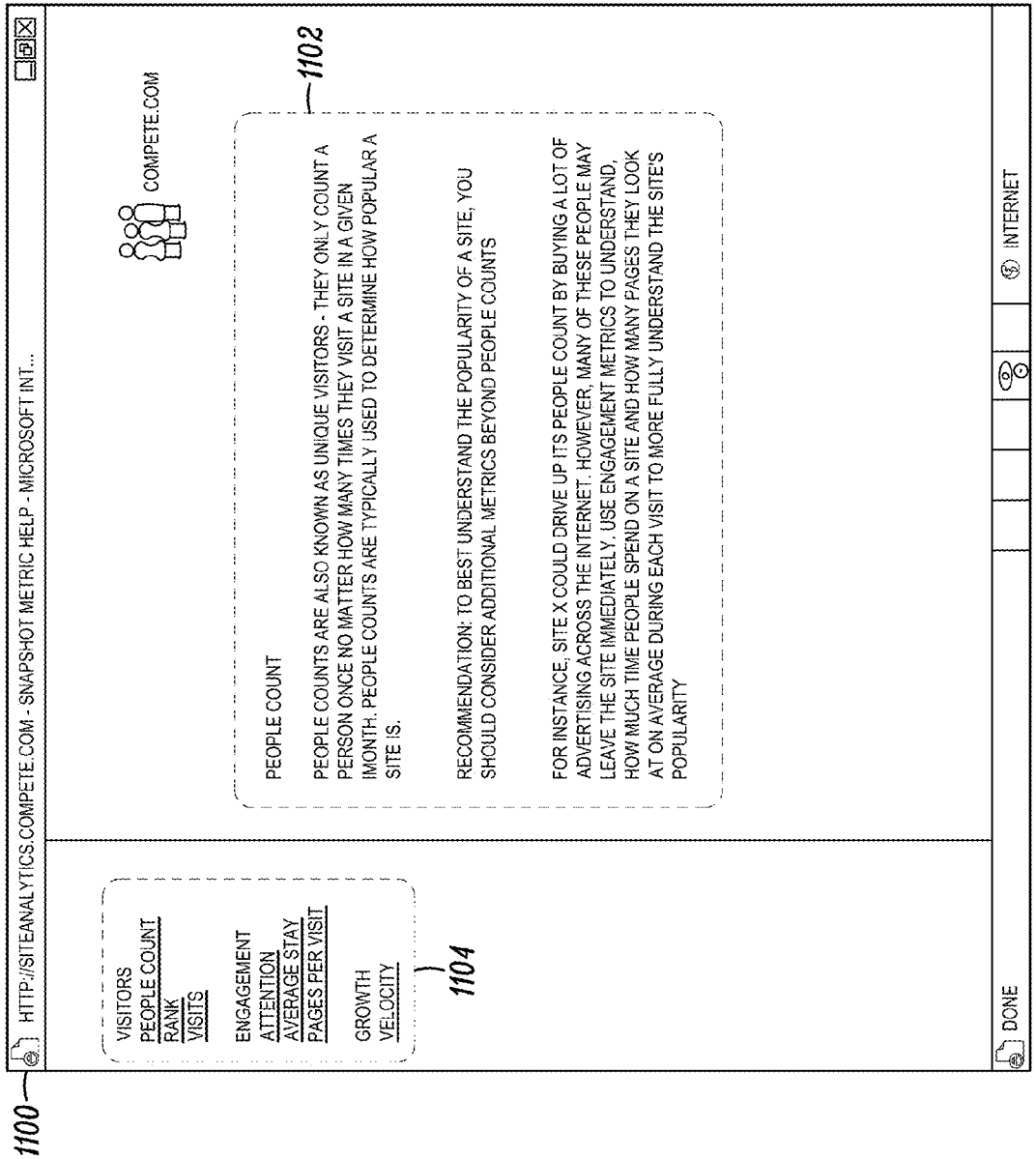
FIG. 11 depicts a full description window.

FIG. 11 depicts a full description window 1100 that may be presented when a user selects a "See Full Description" link that is presented in the chart 1008 shown in FIG. 10. The window 1100 provides a detailed description 1102 of the metric and includes links 1104 to full descriptions of other metrics.

Figure 12:
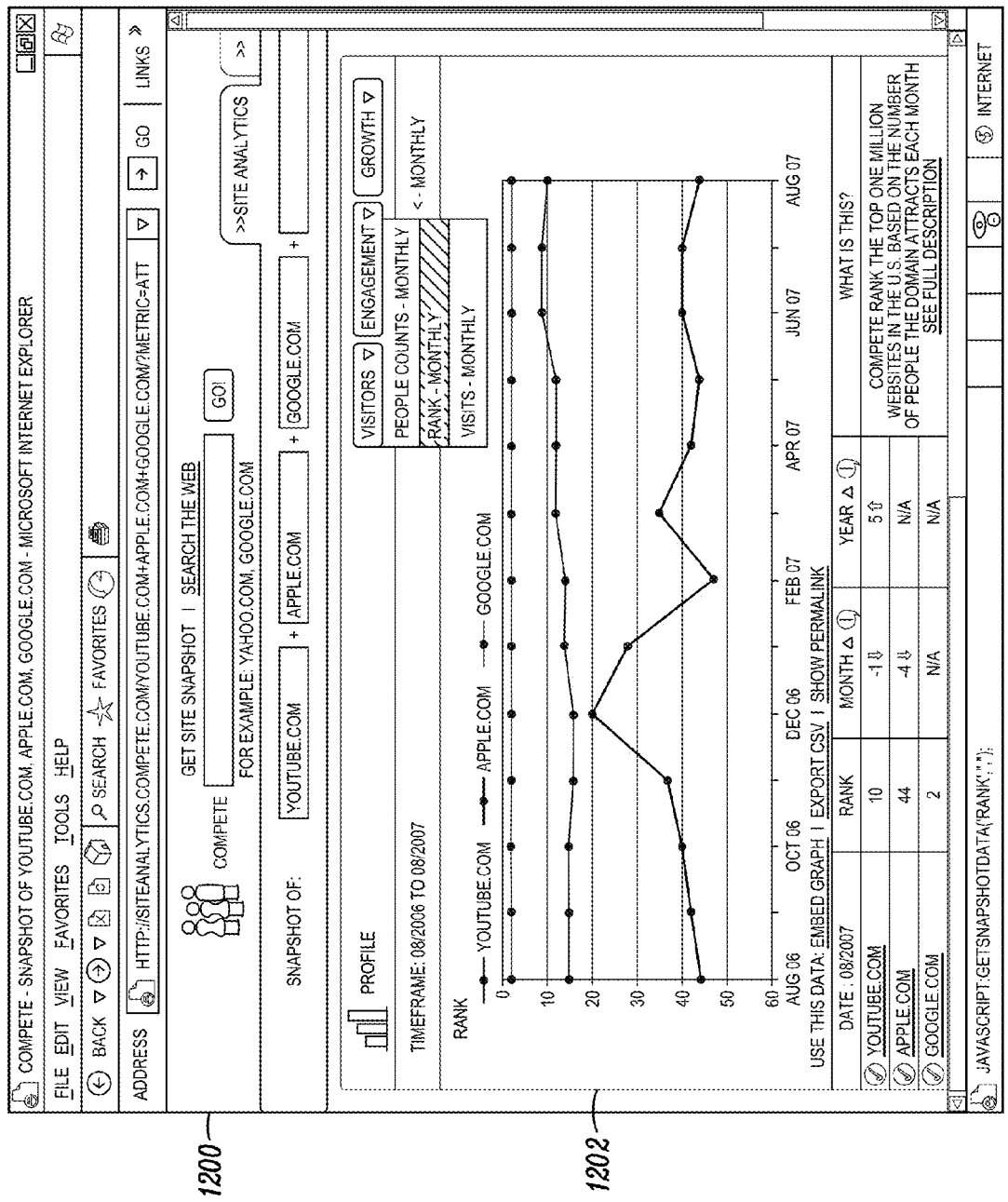
FIG. 12 depicts a rank metric web browser window.

FIG. 12, a rank metric web browser window 1200 of site analytics for three sites, includes a rank graph 1202 of three sites. The graph shows a rank (vertical axis of the chart 1202) as herein described for each of the three sites in each month over a thirteen month period (horizontal axis of the chart 1202). At the bottom of the rank chart 1202 summary information about the rank metrics is presented. This summary includes the rank value of each web site in the most recent time period (e.g. Aug-07), a one month and a one year change in rank, and an overview description of the rank metric. Information that is not available or may not have sufficient support in the site analytics data sources may be represented as "N/A".

By presenting two or more web sites simultaneously in a chart, such as the rank chart 1202, a user can readily view the metric of each of the presented web sites relative to each other. In the example of FIG. 12, a viewer may determine through the graphic presentation in the chart 1202 that google.com is consistently higher ranked than youtube.com or apple.com. A viewer may also determine that youtube.com is increasing rank over the past year, while apple.com has had a spike in rank, but otherwise has a nearly flat ranking from a year ago. Such results may indicate that an event, such as a holiday shopping season in December 2006 contributed to the higher ranking for apple.com.

Figure 13:
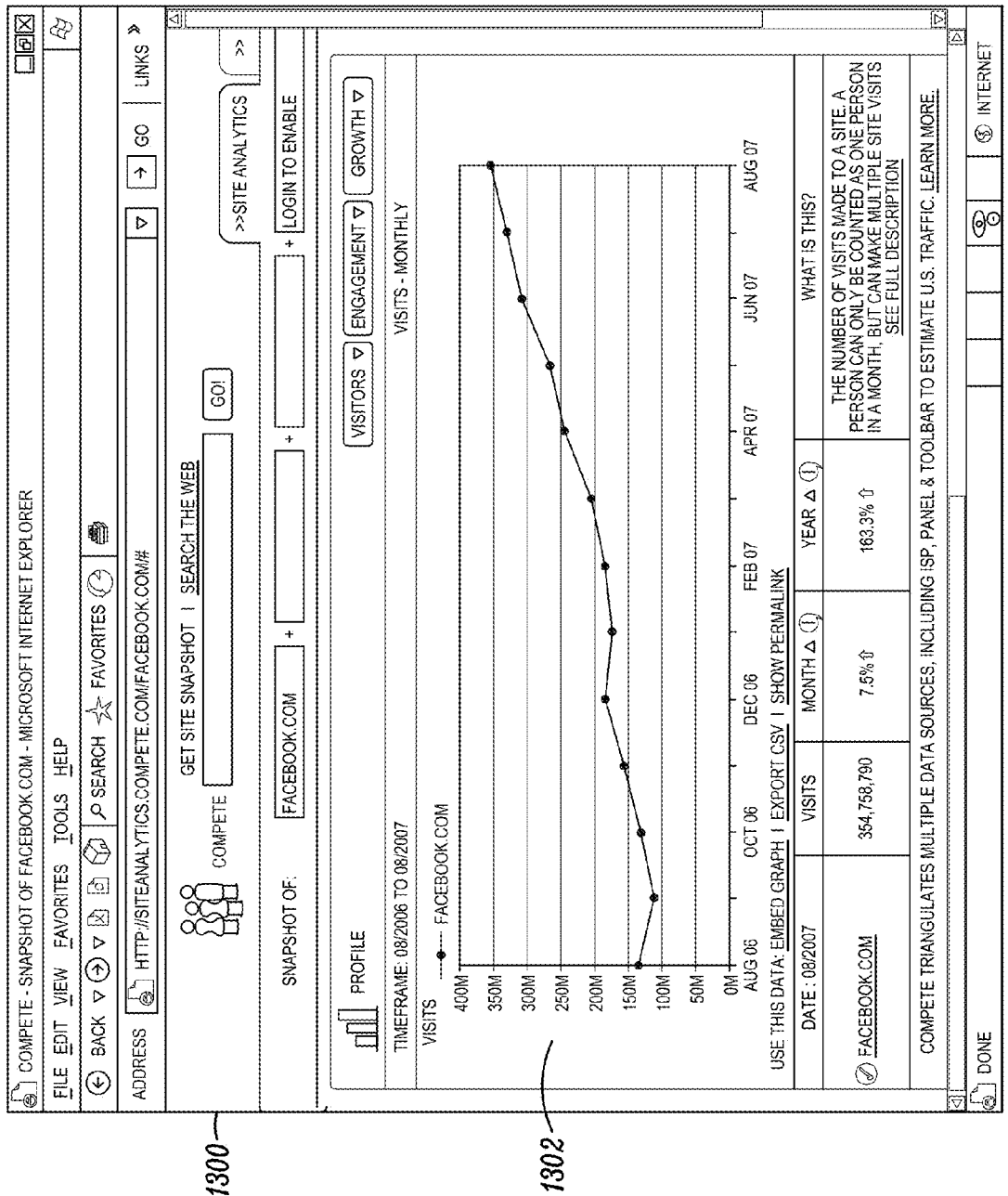
FIG. 13 depicts a visits metric web page.
Figure 14:
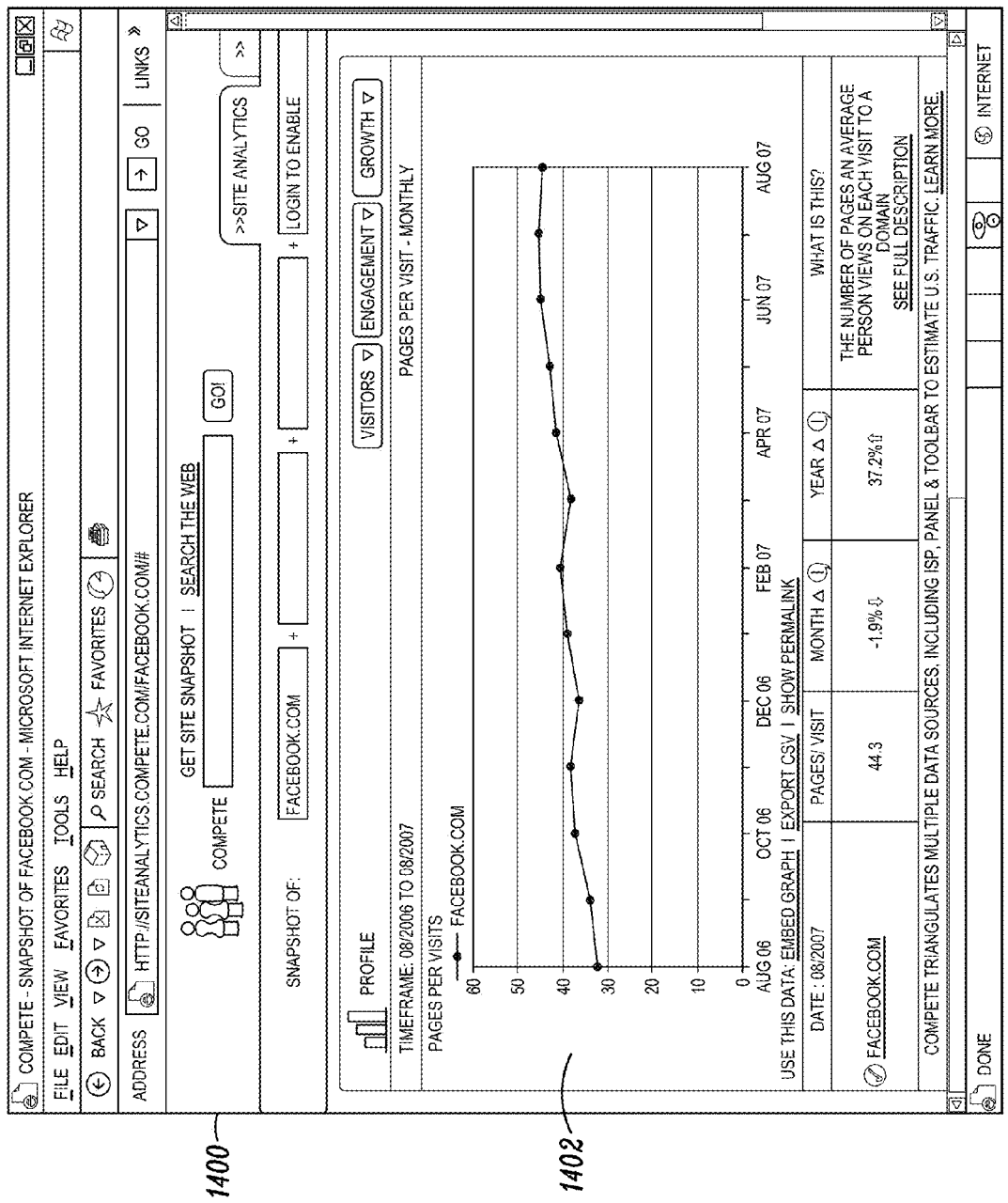
FIG. 14 depicts an engagement type metric web page.
Figure 15:
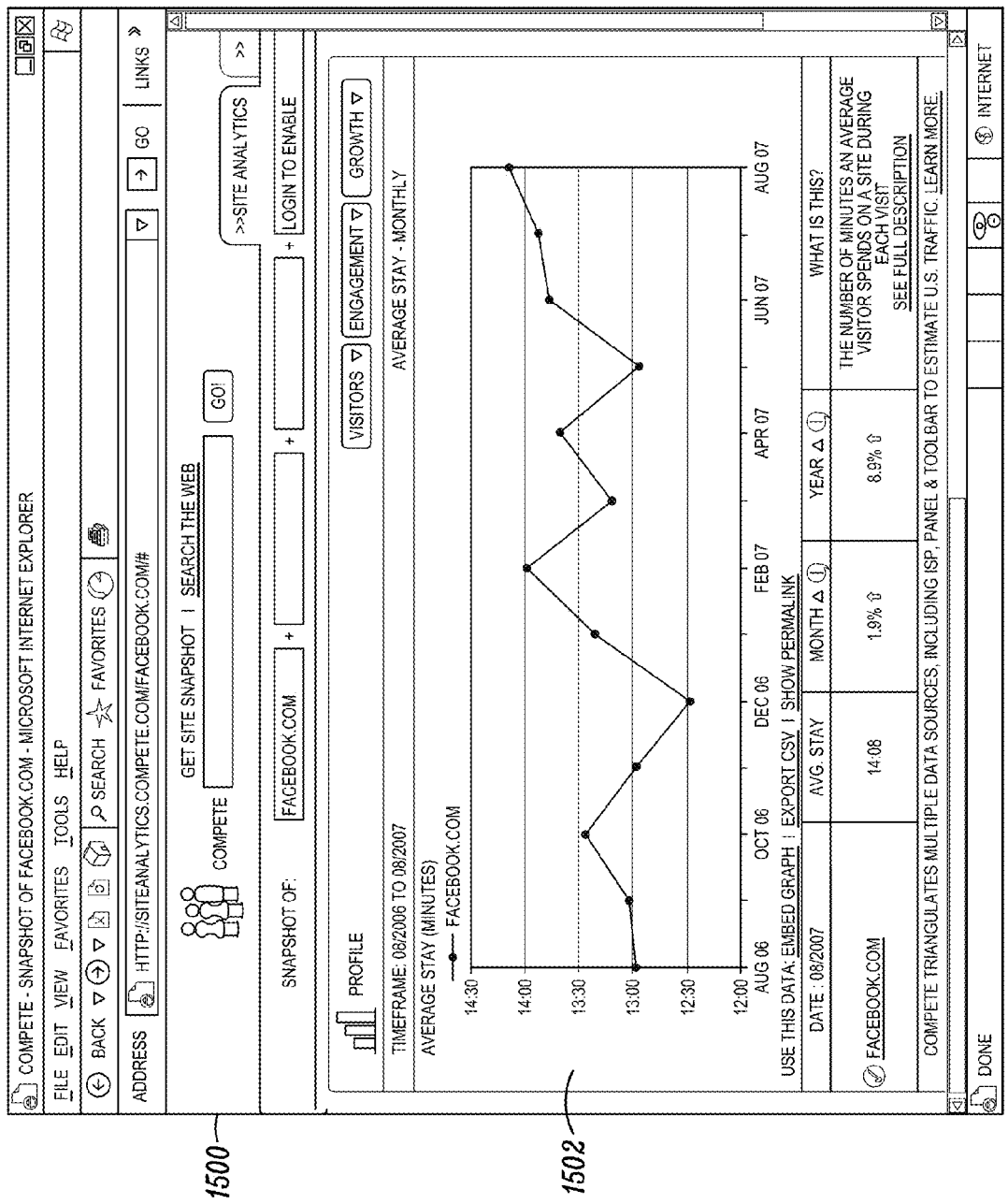
FIG. 15 depicts an engagement type metric web page.

FIGS. 13 through 15 depict other site analytic metrics for a single web site in a chart display that is similar to the metrics charted in FIGS. 10 and 12. FIG. 13 depicts a visits metric web page 1300 presented in a web browser displaying a visitor type metric described herein as visits. The visits metric chart 1302 is a line graph of a visits metric as calculated each month over a thirteen month period. FIG. 14 depicts an engagement type metric web page 1400 presented in a web browser displaying a pages per visit metric as herein described. The pages per visit metric chart 1402 is a line graph of a pages per visit metric as calculated each month over a thirteen month period. FIG. 15 depicts an engagement type metric web page 1500 presented in a web browser displaying an average stay (minutes) metric as herein described. The average stay metric chart 1502 is a line graph of an average minutes per stay metric as calculated each month over a thirteen month period.

Figure 16:
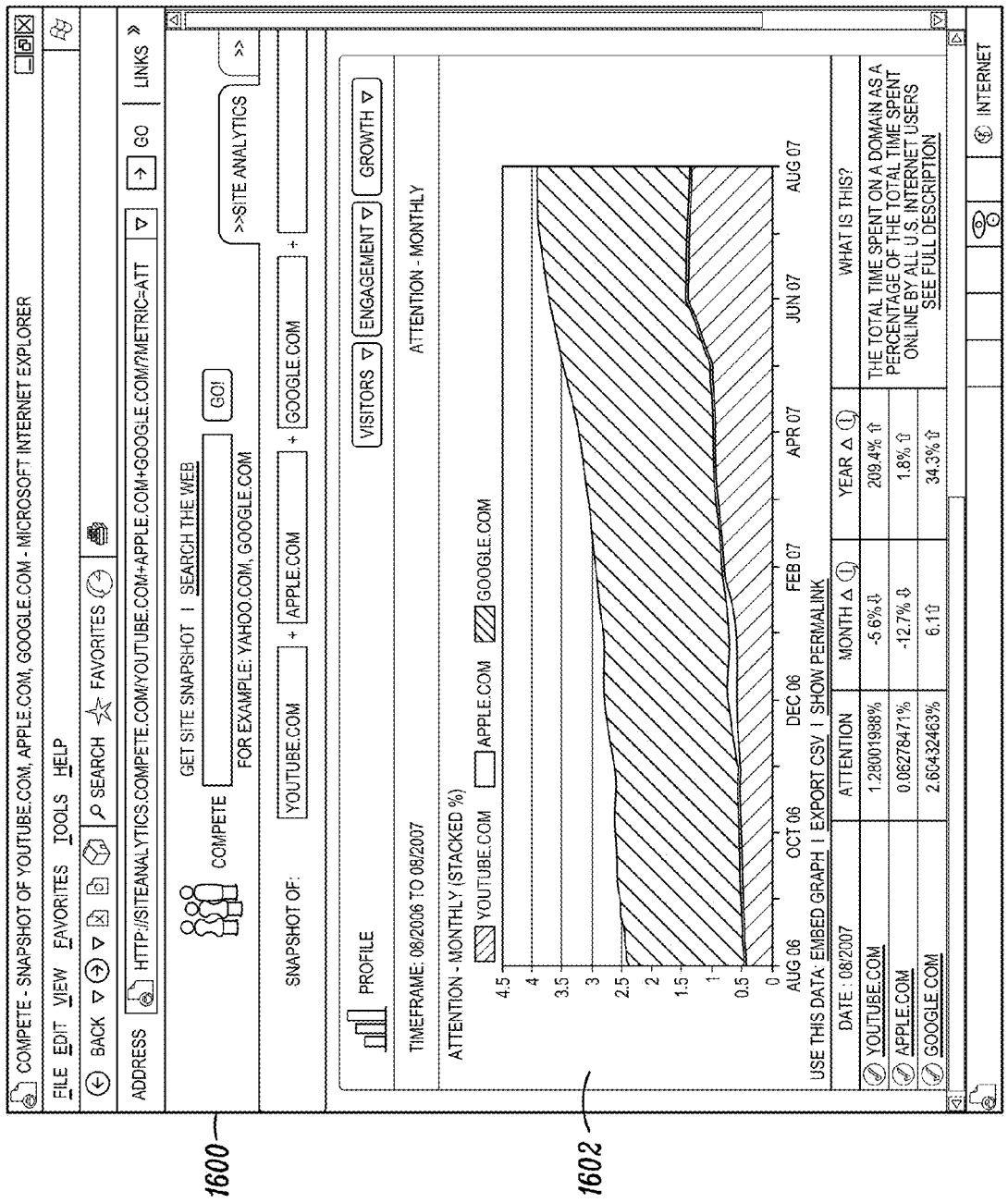
FIG. 16 depicts an engagement type metric attention chart.

FIG. 16 depicts an engagement type metric chart described herein as an attention metric. The attention metric web page 1600 includes a monthly attention chart 1602 of three web sites. While the timeline associated with this chart is monthly (see the horizontal axis of chart 1602), other timelines are possible including daily, weekly, hourly, and any other time period over which attention may be determined. The monthly attention chart 1602 is presented as a stacked area chart to provide a visual indication of relative magnitudes of each web site presented in the chart 1602. A stacked area chart view may allow a user to readily view how the web sites in the chart each contribute to a total attention for the web sites. In the monthly attention chart 1602, in the month of August 2007 (Aug 07 on the horizontal axis), a total attention for the three web sites is 3.9%. When compared to the time period of August 2006 (Aug 06 on the horizontal axis) the group attention has increased 1.6× (from 2.4% to 3.9%). However, the summary at the bottom of the chart 1602 indicates that each web site has contributed to that 1.6× increase in different ways. In the example of FIG. 16, youtube.com has increased attention by 2.09×, whereas apple.com has essentially remained flat (1.01×) and google.com has increased moderately (1.34×). This visual stacked presentation of the attention metric provides a powerful way to identify which of the analyzed web sites has contributed to an overall change, and how each web site has changed relative to the others.

Figure 17:
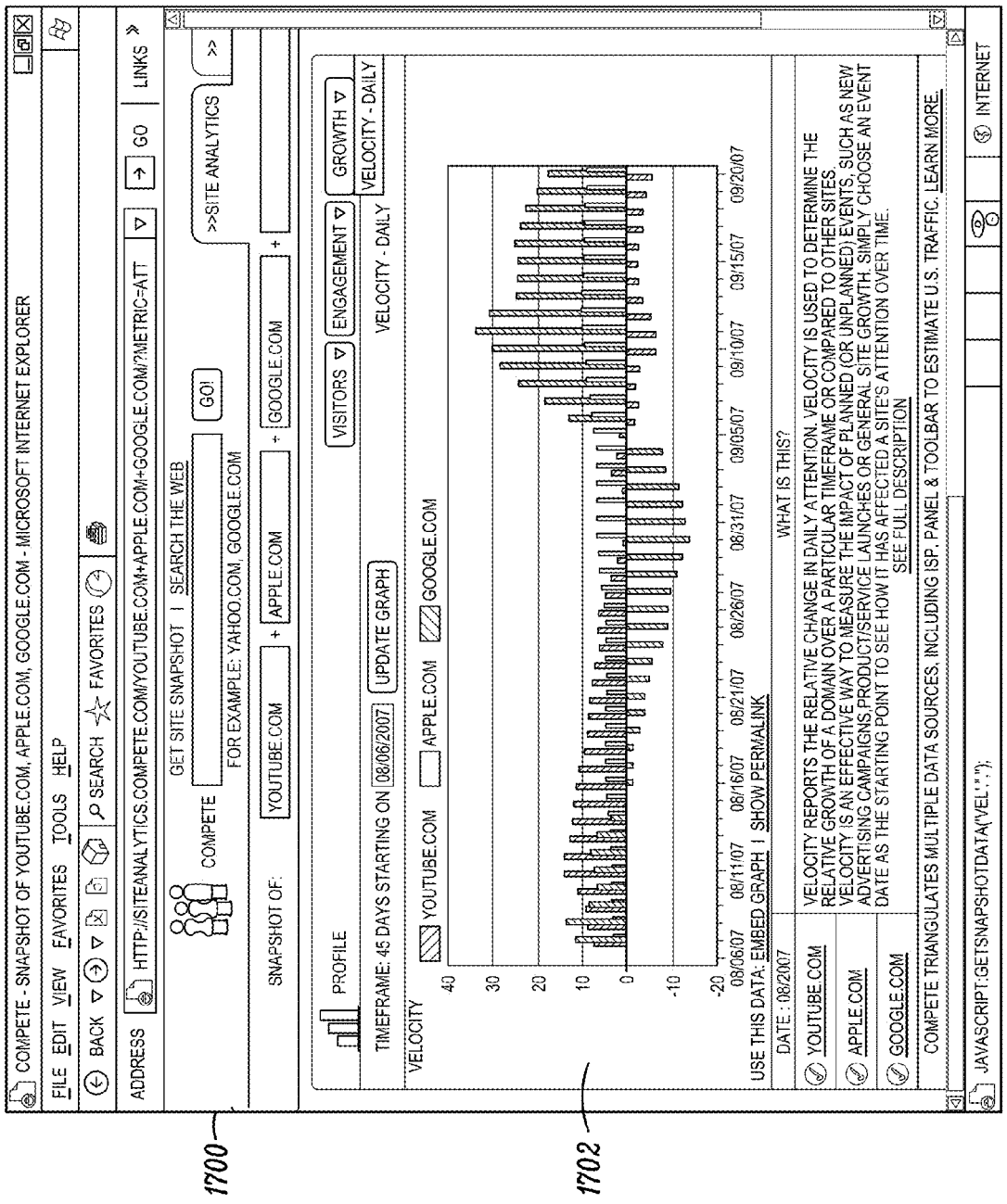
FIG. 17 depicts a chart for a growth type site analytic-velocity.

FIG. 17 depicts a growth type site analytic described herein as velocity for three web sites. Velocity metric, as herein described provides a daily measure of change of an attention metric. Because velocity metric is a relative metric, calculations, and therefore data presented in a velocity chart 1702 are determined from a baseline attention value. In the example of FIG. 17, the baseline attention value is a daily attention value as of the starting date in a Timeframe portion of the chart (e.g. Aug. 6, 2007). The velocity chart 1702 is a bar graph showing discrete daily changes in attention from the baseline attention. To present more than one web site velocity on a single chart 1702, the baseline attention values are normalized to zero so that each bar in the chart 1702 represents a change in attention from the normalized baseline. Although zero is represented in the chart 1702 to allow for easy visualization of positive and negative velocity, other values or symbols may be used.

In the velocity chart 1702, it can be seen that daily attention changes over a 45 day span from a baseline date of Aug. 6, 2007 vary widely for each of the three sites. Google.com generally shows steadily increasing daily attention, while apple.com varies dramatically over the 45 day chart, and you tube.com is varying substantially less than apple.com yet may be indicating a trend of reducing attention.

Although not shown (to reduce clutter in the figures), in addition to the charts 1302, 1402, 1502, 1602, and 1702, each web page 1300, 1400, 1500, 1600, and 1700 includes features depicted in FIG. 10 including, without limitation, drop down menus 1022, analytics overview 1010, company profile 1012, search analytics top keywords 1014, current promotions 1018, registration offer 1020, and chart summary at the bottom of each chart 1302, 1402, 1502, 1602, and 1702.

FIG. 18 depicts a user selection for embedding a site analytic metric chart (graph) as shown in FIGS. 12-17. In response to a user selecting to embed a graph 1802 on a chart, such as example chart 1804 in FIG. 18, embed snapshot graphs window 1800 is displayed in a web browser. The window 1800 offers the user various options for embedding a complete chart such as those shown in FIGS. 12-17, in a web page or other document by presenting sample images and associated HTML code that the user may replicate.

Figure 19:
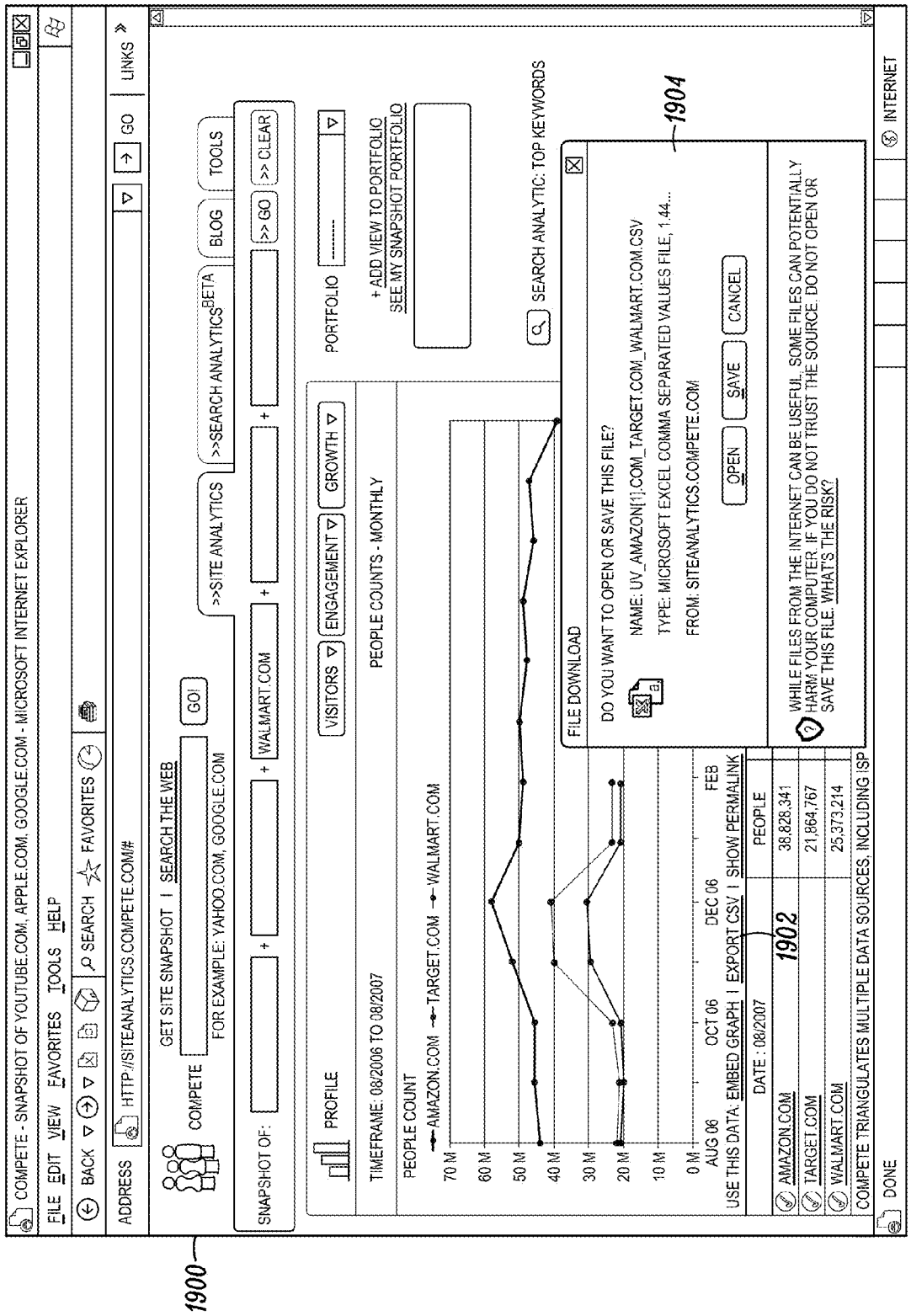
FIG. 19 depicts a screen response to a user selection to download chart data.

FIG. 19 depicts a typical response to a user selection to download data used to generate a chart, such as the charts shown in FIGS. 12-17. When a user selects export CSV 1902 from a metric window 1900, a download dialog window 1904 may appear to allow the user to specific a filename and download location and complete the download.

Normalization of clickstream data sources may be beneficial in that biases in data sources may be accounted for; attrition and turnover of individuals providing clickstream data may be adjusted for; data sources with narrow demographics may be used without the narrow demographics causing the combined clickstream data to misrepresent a general internet browsing population. In as much as a general internet browsing population includes a wide variance in users, normalization of clickstream data from various sources may facilitate scaling the data to reflect the general internet browsing population. Normalization of clickstream data and associated demographics and the like may also allow significantly different data sources, each possibly containing biases or lacking demographics, to be used in the methods and systems herein described to provide useful and beneficial analysis of clickstream data that may be representative of a general internet browsing population.

Figure 20:
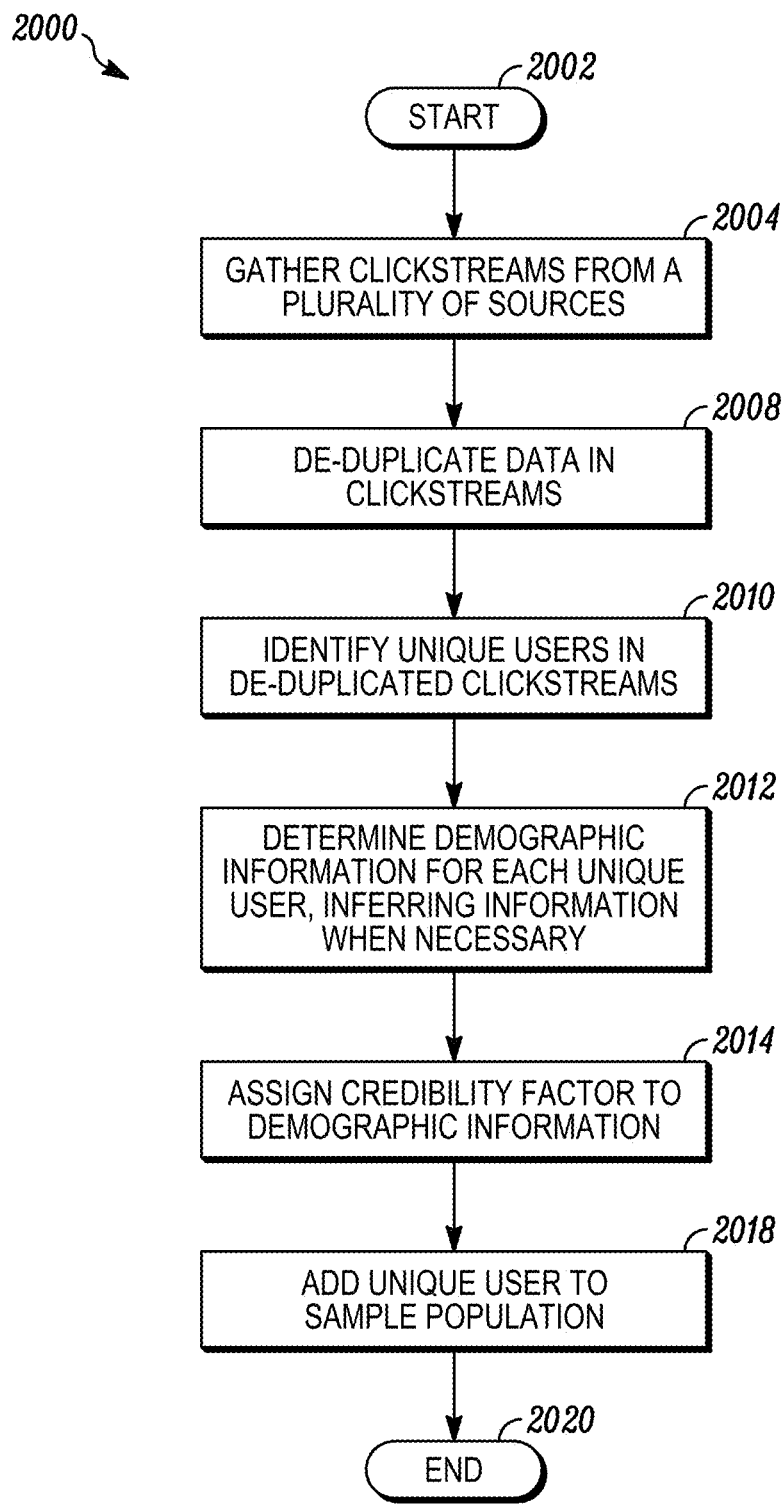
FIG. 20 depicts a flow chart of a process for determining a sample population.

FIG. 20 depicts a flow chart of a process 2000 for determining a sample population or a selected panel of users to use in clickstream analysis and reporting as herein described. The sample population may comprise unique users with known or inferred demographic information. The process 2000 for determining the sample population may begin at logical block 2002. Processing flow may continue to logical block 2004 where the process gathers clickstreams from a plurality of sources. The clickstream samples may be more or less comprehensive and may correspond to a particular time period. In embodiments, the time period may be a day, week, month, and so on. In embodiments, the clickstream data may be gathered from an Internet Service Provider (ISP), an Application Service Provider (ASP), a proprietary or third-party panel, and so on. In embodiments, the proprietary or third-party panel may comprise a set of users who use web browsers that provide a clickstream capture facility such as and without limitation a data collection server. The click stream capture facility may record a user's clickstream in real time and then transmit the clickstream to a facility that gathers such clickstream. In embodiments, this transmitting may occur in real time or from time to time.

It will be appreciated that an embodiment of gathering clickstreams from a plurality of sources may be described in steps 302, 304, 308, 310, 312, and/or 314 of FIG. 3 of U.S. patent application Ser. No. 10/267,978 entitled CLICKSTREAM ANALYSIS METHODS AND SYSTEMS ("the related application"). Moreover, it will be appreciated that FIG. 4 of the related application may disclose an embodiment of a process for gathering clickstreams from a plurality of sources. It will also be appreciated that, in embodiments, gathering clickstreams from a plurality of sources may involve converting files from a plurality of data providers into a common file format, as is disclosed at a high level in step 502 of FIG. 5 of the related application and as is disclosed in detail in flow diagram 600 of FIG. 6 of the related application. It will further be appreciated that a file cleansing process—such as that disclosed by element 800 of FIG. 8 of the related application—may be applied to files from the plurality of data providers and/or files in the common file format.

Next, processing flow may continue to logical block 2008 where the process 2000 for determining the sample population may de-duplicate data in the clickstream. It will be appreciated that de-duplication of data in the clickstream may be disclosed in step 322 of FIG. 3 of the related application.

Continuing from logical block 2008 to logical block 2010, the process 2000 may identify unique users whose Internet behavior is captured in the clickstream. Following that, the process 2000 may continue to logical block 2012 where it determines demographic information for each unique user. The demographic information may include age, income, gender, zip code, any and all combinations of the foregoing, and so on. If will be appreciated that such determining of demographic information may be an example of what is contemplated by step 320 of FIG. 3 of the related application.

In some cases, the demographic information may simply be known. For example and without limitation, an ISP that provides the clickstream data may also provide the demographic information for the unique users whose actions are captured in the clickstream. For another example and also without limitation, a user may provide the demographic information as part of a process for installing the clickstream capture facility into his web browser. In cases like these, a lookup may determine the demographic information for a unique user.

In other cases, however, some or all of the demographic information for a unique user may not be known. The process 2000 for determining the sample population may attempt to infer the otherwise unknown demographic information. Such an inference may be drawn by applying an algorithm, a heuristic, a plurality of any one of the foregoing, any and all combinations of the foregoing, or the like to inputs that relate to the unique user. The inputs may, without limitation, include clickstream data, demographic data reported by a third party, demographic data inferred by a third party, so-called geo-IP data (that is, data from an IP-address-to-zip-code conversion process), and so on. In embodiments, the algorithm may be a supervised-learning algorithm such as and without limitation a Classification And Regression Tree (CART). In any case, when drawing the inference using a combination or plurality of algorithms and/or heuristics, one element of the combination or plurality may provide an inference that is later overridden by another element of the combination or plurality. The inference may at least in part be based upon webpage or website access patterns, domain or sub-domain access patterns, penetration into informational categories, an IP address, a zip code, and the like.

In embodiments, a rules-based heuristic may, on a case-by-case basis, override a CART's inference. For example and without limitation, the CART may infer that a unique user who accesses a certain category of information address is male. However experience may show that, for whatever reason, users who access that category of information are almost always female. The rules-based heuristic may be coded to override the CART's inference when the CART infers that the unique user is male and the unique user is known to access that category of information. Many other such embodiments will be appreciated and all are within the scope of the present disclosure.

In embodiments, the inference may contain default or random information—especially in cases where a more enlightened inference is unavailable or when a plurality of inferences conflict to such a degree that it cannot be determined with an acceptable degree of certainty which one of the conflicting inferences is most likely to be accurate.

At some point, the process 2000 for determining the sample population may continue to logical block 2014 where it assigns a credibility factor to the demographic information. This factor may relate to a statistical level of confidence in a unique user's demographic information. This statistical level of confidence may be used in computations associated with the unique user's demographic information. Thus, the normalization process may be able to scale Internet-behavior statistics of the sample population in a more accurate manner when taking the credibility factor into account. Credibility factors may be applied to unique users, clickstream sources, groups of users within a sample population, and the like. Computations, calculations, analysis, and processing of information to which one or more credibility factors have been applied maybe affected by the credibility factor so that a desired treatment of the information can be achieved algorithmically.

Next, the process 2000 continues to logical block 2018 where it adds the unique user to the sample population, creating a new panel user. An embodiment of adding unique users to a sample population may be disclosed in steps 920 through 928 of FIG. 9 of the related application. In embodiments, adding the unique user to the sample population may involve a statistical process that is described in paragraph [0065] of the related application. Finally, the process 2000 for determining the sample population ends at logical block 2020. In an example, a sample population may include users who are unique, active in the current sample period, and have demographics. Additionally, the sample population may be restricted to users who also were active in the prior sample period.

Figure 21:
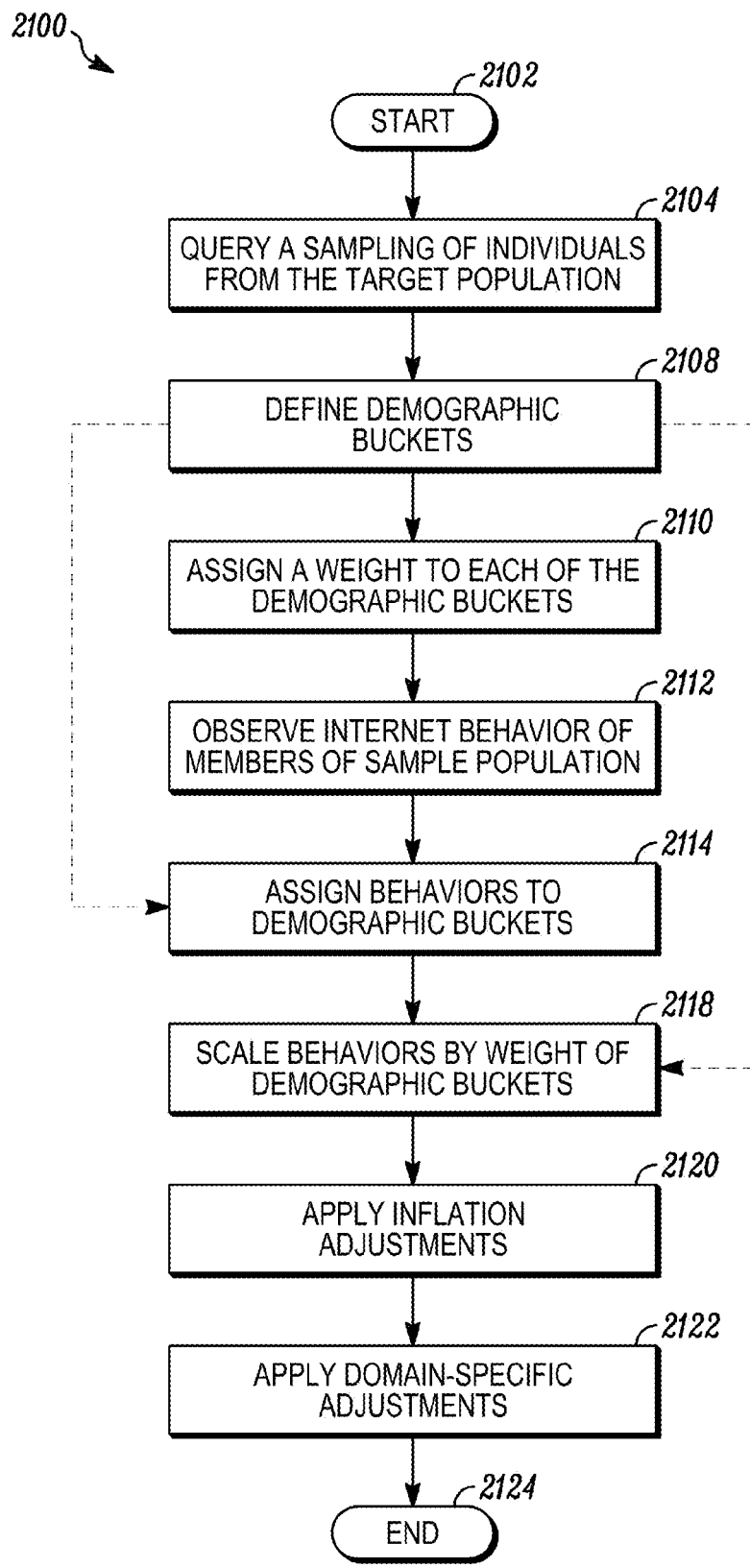
FIG. 21 depicts a flow chart of a normalization process.

Having determined the new panel sample population and its demographics, it may be possible to estimate the Internet-behavior statistics or metrics of any and all target populations by applying a normalization process to the Internet-behavior statistics or metrics of the sample population. FIG. 21 depicts a flow chart for such a normalization process 2100, which scales Internet-behavior statistics or metrics of a sample population so that the Internet-behavior statistics or metrics reflect a different target population. The target population may or may not be larger and more general than the sample population. For example and without limitation, the target population may comprise the U.S. Internet user population (also referred to herein and elsewhere as the Internet Browser Population or IBP) and the sample population may comprise a relatively small panel of Internet users. The Internet-behavior statistics or metrics may, without limitation, include or relate to unique users, page views, search terms, session conversions for specific sites (wherein a site may comprise a URL, domain, sub-domain, or the like), a trajectory across or including several sites (for example and without limitation homepage click-through behavior), any and all of the metrics described herein and elsewhere, any and all combinations of the foregoing, and so on. The Internet-behavior statistics may be drawn from clickstream samples. The clickstream samples may originate from direct observation and/or probability-based sampling. The target population may be circumscribed by geographic extent (for example and without limitation, America, North America, Global, and so on); Internet usage (for example and without limitation, web browsing, email access, all Internet access, and so on); and the like.

Without limitation, scaling Internet-behavior statistics may be done on the basis of total sample size and/or on the basis of demographic-specific weights. The demographic-specific weights may be chosen in such a way the scaling produces Internet-behavior statistics that mirror, in a statistically significant way, actual Internet-behavior statistics of the target population. In other words, with the proper demographic-specific weights, one may project or estimate the actual Internet-behavior statistics of a target population based upon the Internet-behavior statistics of the sample population.

In embodiments, both the sample population and the target population may comprise dial-up Internet users and broadband Internet users in various proportions. The proportion of dial-up users to broadband users for the sample population may differ from the proportion of dial-up users to broadband users for the target population. One or more forms of scaling or adjustment may be applied to the clickstream samples to account for such a difference. These forms of scaling of adjustment may include static or dynamic values that change over time. The static values may be hardcoded and/or based upon a heuristic. The dynamic values may be calculated according to a formula, function, algorithm, or the like.

The process 2100 starts at logical block 2102 and continues to logical block 2104 where it queries a more or less random sampling of individuals from the target population. This querying may determine various facts about the individuals including without limitation their demographics, their Internet use in the previous 30 days, their children's Internet use in the previous 30 days (if applicable), and so on. Based upon both these facts and perhaps other facts about the target population at large, it may be possible to estimate the size and demographic makeup of the target population. It will be appreciated that an embodiment of such querying may be disclosed in step 908 of FIG. 9 of the related application.

In any case, processing flow may continue to logical block 2108 where a number of demographic buckets are defined. Each bucket may correspond to a unique range of ages, genders, and household incomes. Some or all of these ranges may relate to the facts about the sampling of individuals from the target population. Moreover, some or all of these ranges may relate to facts about individuals that can be determined or inferred from clickstream data. Such facts may, without limitation, relate to age, gender, household income, education, employment, census division, metropolitan status, and so on.

Now that the size and demographic makeup of the target population has been estimated, it may be possible to determine how many members of the target population that each member of the sample population represents. Processing flow continues to logical block 2110 where this determination may be made and then encoded as a weight that is assigned to a demographic bucket. This weight may be the estimated target population of the bucket divided by the number of members in the sample population in the bucket.

As the Internet behaviors of a member of the sample population are observed (logical block 2112), these behaviors may be assigned to the demographic bucket of the member (logical block 2114) and scaled by the weight of the bucket (logical block 2118) to form an estimate of the Internet behaviors of the target population. For example and without limitation, a demographic bucket may correspond to 18-25 year-old males. The weight of this bucket may be 348. A member of the sample population may be a 19 year-old male. Clickstream data from this member may indicate an Internet behavior that is visiting a first website and then visiting a second website. This behavior may be assigned to the aforementioned demographic bucket and scaled by the weight of the bucket. As a result, the estimated Internet behavior of the target population includes 348 instances of 18-25 year-old males visiting the first website and then the second website. Many other such examples will be appreciated and all such examples are within the scope of the present disclosure.

The estimate of the Internet behaviors of the target population may be further refined through the application of inflation adjustments (logical block 2120). These inflation adjustments may account for periodic or occasional variations in the Internet behavior of the sample population and/or the estimated makeup of the target population. These variations may be due to attrition within the sample population, variability of the estimated makeup of the target population, reformulation of the sample population, modification of a benchmark or other basis used to formulate or estimate the sample population and/or the target population, and so on. In any case, the inflation adjustments may be encoded in a weight that is referred to herein and elsewhere as a Global Inflation Factor or GIF. So, observed Internet behaviors of a member of the sample population may be assigned to a demographic bucket and then scaled by both the weight of that bucket and the GIF. This may produce a more accurate estimate of the target population's Internet behavior than would result from applying the bucket's weight alone.

The estimate of the Internet behaviors of the target population may be further refined through the application of domain-specific adjustments (logical block 2122), which may be referred to herein and elsewhere as Domain Specific Normalization, Diverse Source Normalization, or DSN. These adjustments may take into account data from a plurality of sources to compensate for domain-specific biases such promotional bias, structural bias, and so on. In embodiments, an adjustment of this type may comprise a weight. In embodiments, these weights may be calculated using triangulation.

Structural bias may occur when a site is overrepresented or underrepresented due to the makeup of the sample population. For example and without limitation, in a sample population consisting only of dial-up Internet users, graphic-intensive sites may tend to be underrepresented because the members of the sample group may experience significant delays in accessing the sites. For another example and also without limitation, in a sample population containing a relatively high proportion of sophisticated Internet users, sites that cater to sophisticated Internet users may be overrepresented. Sites that cater to sophisticated Internet users may include sites that require high bandwidth connections, such as streaming video sites.

Promotional bias may occur when a source of clickstream data has a higher-than-relative growth in traffic when compared with other sources of clickstream data. Such spikes in clickstream data may be due to promotions and sometimes need to be mitigated lest they result in overstating the Internet behavior of the population at large, such as the target population.

Following the application of domain-specific adjustments the process 2100 may end at logical block 2124.

In embodiments, one may determine the presence of structural or promotional bias by comparing a selection of the most trafficked domains for both penetration and period-to-period growth across all sources of clickstream data. When the sources of clickstream data do not agree, then a bias may be present in the clickstream data. Alternatively or additionally, a matrix of all data from all sources for a selection of domains may be run through a number of rules for indicating different biases. In any case, an automatic process for determining the presence of a bias may produce a report that can be reviewed manually. The report may contain domain information, category information, a description of the bias, data that supports the bias, and so on.

In embodiments, processes 2000 and 2100 may be alternatively connected so that different paths through the connected processes are possible. Logical block 2024 may directly connect to logical block 2102 or to logical block 2108 based, for example, on availability of relevant data from a target population.

In embodiments, process 2100 may include alternative flows among the logical blocks to facilitate alternative or optional processes. In an example, determining a behavior, such as visiting a domain, could follow a process that may not include logical blocks 2110 and 2112. In another alternative flow, behaviors may be pre-assigned to demographic buckets so a flow may omit logical step 2114. In a more general embodiment, each logical block in the flows represents logical operations that may be applied to the various data to which the processes herein are applied. If in a given embodiment, a logical block is not required to produce the desired outcome, the logical block may be bypassed or it may simply propagate the data to another logical block.

In embodiments, a volume metric of Internet behavior (such as page views, uniques, visits, and so on) may be calculated with respect to a demographic bucket according to the following equation: samples from sample population*weight*GIF* DSN=estimated samples of target population. For example, if the clickstream data from all sources indicates 100 pages views at www.domain.com by 18-25 year-old males in the sample population and the weight of the 18-25 year-old male demographic bucket is 10 and the GIF is 5 and the DSN for www.domain.com is 2 then the estimated number of page views by 18-25 year-old males in the target population is 10,000.

Multiple users of the DCA may comprise a DCA panel. The DCA panel may be used to collect data regarding specific internet traffic.

In some embodiments, data collected by the DCA may be used to determine a user's web browsing behavior and patterns across many different websites, whether or not traffic at those websites is monitored independently. Web browsing behavior for a panel of users of the DCA (DCA panel) may be determined using data collected from the panel by each DCA used by the panelist. In some embodiments, the panel data may be used to estimate the web browsing behavior of the internet population in general. For example, one metric may simply be internet traffic at a particular website. In the example, data from a panel of users may be weighted to determine or estimate actual traffic levels for all internet users. For example in the United States, there is an estimated total internet audience of 310 million. Weighting involves determining the percentage of the population represented by the panel and using that representation, or weighting factor, in further calculations. For example, all unique visitor numbers for sites or page impressions in the panel data may be multiplied or weighted by the weighting factor in order to estimate the actual traffic levels.

A hybrid measurement approach involves combining panel data with site-centric, or census-based, measurements. Site-centric measurement means directly measuring traffic at a particular website utilizing software or code adapted to make such a measurement or by gathering data from a server dump. In embodiments, any census-based approach may be used to obtain data regarding internet traffic at a particular website or domain. Panel data involves collecting internet behavior data for individual users across a number of websites and domains. Panel data for a particular website may be scaled up and compared to site-centric data for that particular website, such as to, for example, confirm the reliability of the panel approach. One way to scale up the data involves simply scaling the panel data to the overall population of a group of internet users. For example, of 10,000 users who are taking part in the panel, say 2000 users visit a monitored web site (resource) or perform particular interactions on that web site which has corresponding site centric measurements output available.

The 2000 DCA panellists who have accessed the web site that is monitored are scaled up in accordance with a target population, such as the internet browser population, to determine a number that represents the number of visitors estimated to have actually visited that site. This results in an expected 62 million users in the internet population to visit this site over the predefined period. There is an expectation that the numbers obtained, after scaling up, and the actual site-centric measurements should have some degree of correspondence.

This approach cannot provide insight into whether or not the internet browsing behavior of people in the panel is representative of the population to which the panel data are being scaled. Simple scaling blurs the line between potential sub-populations of visitors to a website.

In order to effectively use panel data to estimate all traffic to a website or specific domain for a sub-population, additional steps need to be taken. The population that the panel data are being scaled against needs to be divided into sub-populations by characteristic, behavioral trait, or demographic strata. Demographic strata may be generated by defining sub-populations of panelists according to age, gender, income, and the like. Then, each stratum is defined by a combination of one or more of the sub-populations. For example, a stratum can consist of one or more sub-populations from each of the age, gender or income groups. It should be understood that any demographic characteristic may be used to define a sub-population, such as race, ethnicity, citizenship, location, marital status, languages, disabilities, mobility, home ownership, sexuality, employment status, and the like.

Figure 22:
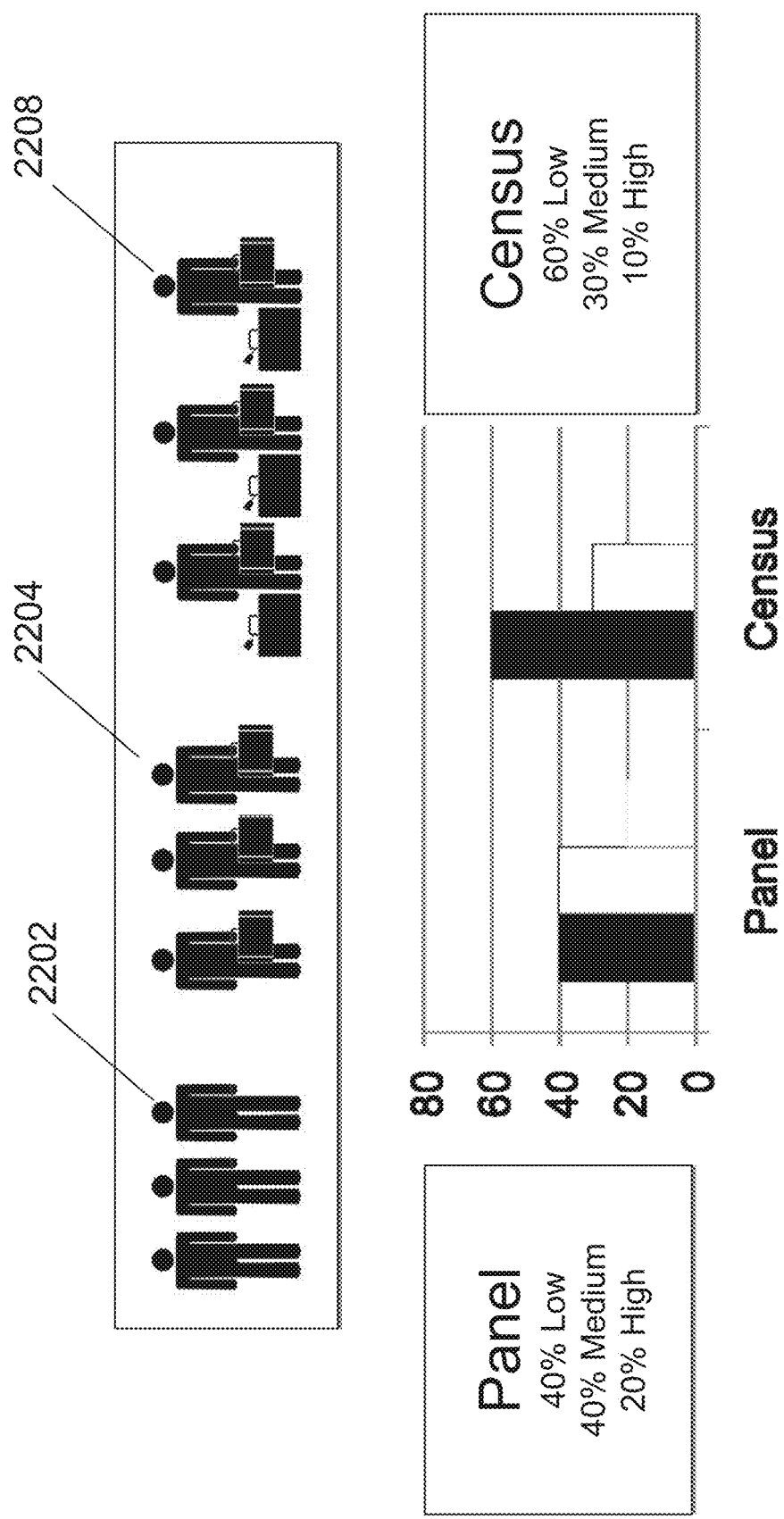
FIG. 22 depicts a flow diagram of a hybrid method for internet traffic measurement.

One or more characteristics related to which it is desired to estimate Internet traffic may be identified. For example, a behavioral trait may be frequency of visits to travel-related domains, such as high frequency visitors, medium frequency visitors, and low or no frequency visitors. Since census-based data may not be available for all travel-related domains and thus the absolute population of visitors to travel-related domains cannot be known, the sub-populations can be described in terms of a percentage of the known, census-based population. Thus, a fraction of a target population consisting of users displaying the characteristic may be determined by analysis of a census-based measurement of all of the internet traffic for at least one website. Census data can be used to understand and identify one or more characteristics or behavioral traits about individuals, but the data must first be attributed to an individual. One example of this attribution is by examining cookies or other information about the machine used to access the webpage and use the information as proxy for a person. Then, behavioral traits may be identified by analysis of the attributed data. For example, FIG. 22 depicts the population of users who visit travel-related domains. The population can be divided into low frequency visitors 2202, medium frequency visitors 2204, and high frequency visitors 2208. Based on census data for traffic to travel-related domains, the low frequency visitors 2202 account for 60% of the traffic, medium frequency visitors 2204 account for 30% of the traffic, and high frequency visitors 2208 account for 10% of the traffic.

Clickstream data, such as clickstream data from the DCA panel, may be received at a host processing facility from a group of participants comprising a panel. The clickstream data connotes Internet activity of individual members of the panel, the Internet activity relating to at least one website. Analysis of the panel data may be used to identify a fraction of the panelists that share the one or more characteristics or behavioral traits identified in the census population. For example, FIG. 22 depicts the same breakdown of internet traffic for travel-related domains by frequency for panelists. Based on panel data for traffic to travel-related domains, the low frequency visitors 2202 account for 40% of the traffic, medium frequency visitors 2204 account for 40% of the traffic, and high frequency visitors 2208 account for 20% of the traffic.

Determining a behavioral composition may involve scaling the fraction of the panelists by the fraction of the target population. For example, in the scenario depicted in FIG. 22, the panel data suggests that 20% of the internet traffic to travel-related domains is from visitors who visit the domains with high frequency. However, it is known from the panel data that the general population of travel-related domain visitors comprises only 10% of high frequency visitors. Thus, in order to scale up the panel data for the high frequency visitors, the weight of their panel data needs to be halved. Then, an estimate of the target population's activity with respect to the travel-related domains may be obtained by scaling the clickstream data for the subset of the panel, in this case the high frequency visitors, by applying a weight based on the behavioral composition and the relative size of the target population. For example, the total number of visitors to travel-related domains may be 25 million and the total number of panelists may be 10,000. If the medium frequency visitor panel data were scaled only to the relative size of the target population, the calculation would simply involve multiplying 25 million by 40% to obtain 10 million. However, because it is known that the medium frequency behavior is actually over-represented in the panel data (40% in the panel versus 30% in the census), the panel data must be weighted to account for this difference. In this case, the weighting is ¾, so the final number for the estimate of medium frequency visitors to travel-related domains is 7.5 million.

In other examples, scaling may be done according the demographic strata, as described above. In order to scale up panel data to a target population, weighting may take into account the proportion of panelists who fall within certain demographic strata.

It should be understood that the weight may be used to scale the clickstream data for the subset of the panel with respect to one website, a plurality of websites, one domain, or a plurality of domains.

Refining the estimate of the target population's Internet activity may be done by applying a global inflation factor (GIF) to the estimate, as discussed previously herein.

The one or more characteristics or behavioral traits may relate to at least one of an internet browsing behavior (also known as a behavioral trait or a characteristic), a demographic characteristic, and a geographic characteristic. For example, the demographic characteristic may be age, income, gender, race, and the like.

Refining the estimate may be done by iteratively applying a weight based on one or more of a demographic composition and a geographic composition of the target population to the estimate.

In an embodiment, inherent in the sampling there may be deviations and therefore a calibration in terms of an error rate is introduced, being the ratio of the site-centric measurements to that of a calibration panel.

In embodiments, the calibration panel may be separate from the DCA panel in that none of the DCA panelists are members of the calibration panel. Continuing with the above example, the calibration panel may be 1000 total calibration panelists. Of these 1000 calibration panelists, 200 visit the site that is monitored. Scaled up, this suggests that 62,000,000 users in the general internet audience would visit the site. Thus, if the actual census data for the number of visits to the monitored web site is 63,000,000, then the actual deviation provides a ratio of 1.016 so that the sample has an error rate of a factor of 0.016. Continuing with the above example, if another 2500 panellists visit a web site that is not monitored and where no site-centric measurement data are available, to estimate the total traffic or users that would access the other web site, the panel data are scaled up similarly to arrive at 77.5 million visits. The ratio of 1.016 is then multiplied by the figure derived above from DCA panelists visiting an unmonitored site (77.5 million) to obtain a corrected value of 78.74 million visits.

Similar or other techniques can be applied on a group of resources, such as a number of web sites or advertising page impressions. Furthermore different metrics, based on different requirements may need alternative calibrations, such metrics including page impressions, unique visitors or time measurement. The calibration may be based on two data sources or more than two data sources, whether they be from monitored or unmonitored resources. Alternatively, the error rate may be based on third party data.

In an alternative embodiment, a separate set of monitored resources just for the error rate creation may be used. In this embodiment, the 2,000 DCA panelists who have accessed monitored resources are scaled up in accordance with the internet to determine a number that represents the number of visitors estimated to have actually visited that site, which is 62 million users. To adjust this estimation for error, the DCA panel is monitored at a second set of monitored resources for which census data exists. The process for generating and applying the error rate follows the process outlined above, however, the principal difference is that no census data is used in conjunction with the main set of monitored resources.

Thus, by using the above methods, sites that are not monitored can have additional data available to them to estimate the amount of traffic, which provides an invaluable resource to interested parties to specifically target users in respect of various activities or interactions that they have undergone in accessing a particular web site. Furthermore, it provides additional information to owners of monitored web sites as to how many visits or interactions/responses unmonitored web sites (being potential competitors to such owners) have had from the internet audience, based on the two or more sources of data, from the site-centric measurements and/or from the user centric measurements, or simply based on the site-centric measurements. Thus more information is available about the behavior of the internet population or audience.

What is claimed is:

1. A method of estimating Internet traffic, the method comprising:
   identifying one or more characteristics related to which it is desired to estimate Internet traffic;
   determining a fraction of a target population consisting of users displaying the one or more characteristics by analysis of a census-based measurement of internet traffic for at least one website;
   receiving clickstream data at a host processing facility from a group of participants that connotes Internet activity of individual members of the group of participants, the Internet activity relating to at least one website;
   identifying a fraction of the group of participants that share the one or more characteristics;
   determining a behavioral composition by scaling the fraction of the group of participants by the fraction of the target population; and
   producing, at the host processing facility, an estimate of the target population's activity with respect to at least a part of the Internet that includes the at least one website by scaling the clickstream data for the fraction of the group of participants by applying a weight based on the behavioral composition and the relative size of the target population.

2. The method of claim 1, refining the estimate of the target population's Internet activity by applying a global inflation factor to the estimate.

3. The method of claim 1, wherein the one or more characteristics relate to at least one of an internet browsing behavior, a demographic characteristic, and a geographic characteristic.

4. The method of claim 1, wherein the weight is used to scale the clickstream data for the fraction of the group of participants with respect to a plurality of websites.

5. The method of claim 1, further comprising, refining the estimate by iteratively applying a weight based on one or more of a demographic composition and a geographic composition of the target population to the estimate.

6. A computer-implemented system for estimating Internet traffic, comprising:
   an analysis facility, operating on at least one processor, that determines a fraction of a target population consisting of users displaying one or more characteristics related to which it is desired to estimate Internet traffic by analysis of a census-based measurement of internet traffic for at least one website;
   a host processing facility that receives clickstream data from a group of participants that connotes Internet activity of individual members of the group of participants, the Internet activity relating to at least one website; and
   an analysis facility, operating on at least one processor, that determines a behavioral composition by scaling the fraction of the group of participants that share the one or more characteristics by the fraction of the target population;
   wherein an estimate of the target population's activity with respect to at least a part of the Internet that includes the at least one website is produced at the host processing facility by scaling the clickstream data for the fraction of the group of participants by applying a weight based on the behavioral composition and the relative size of the target population.

7. The system of claim 6, wherein the estimate of the target population's Internet activity is refined by applying a global inflation factor to the estimate.

8. The system of claim 6, wherein the one or more characteristics relate to at least one of an internet browsing behavior, a demographic characteristic, and a geographic characteristic.

9. The system of claim 6, wherein the weight is used to scale the clickstream data for the fraction of the group of participants with respect to a plurality of websites.

10. The system of claim 6, wherein the estimate is refined by iteratively applying a weight based on one or more of a demographic composition and a geographic composition of the target population to the estimate.

\* \* \* \* \*